(12) United States Patent
Seitz et al.

(10) Patent No.: US 7,244,279 B2
(45) Date of Patent: Jul. 17, 2007

(54) USE OF POLY(ALKYLENE) CARBONATES IN THE MANUFACTURE OF VALVE METAL ANODES FOR ELECTROLYTIC CAPACITORS

(75) Inventors: Keith Seitz, Niagara Falls, NY (US); Ashish Shah, East Amherst, NY (US); Barry Muffoletto, Alden, NY (US); Wolfram Neff, Buffalo, NY (US); Douglas Eberhard, Grand Island, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 11/306,272

(22) Filed: Dec. 21, 2005

(65) Prior Publication Data
US 2006/0198081 A1    Sep. 7, 2006

Related U.S. Application Data

(62) Division of application No. 10/920,942, filed on Aug. 18, 2004, now Pat. No. 7,116,547.

(60) Provisional application No. 60/495,980, filed on Aug. 18, 2003, provisional application No. 60/495,967, filed on Aug. 18, 2003.

(51) Int. Cl.
*H01G 9/00* (2006.01)
(52) U.S. Cl. .................. 29/25.03; 438/171; 438/238; 257/E21.011
(58) Field of Classification Search ................ None
See application file for complete search history.

(56) References Cited

U.S. PATENT DOCUMENTS

| | | | |
|---|---|---|---|
| 4,172,319 A | 10/1979 | Bloom et al. | |
| 4,969,254 A | 11/1990 | Dahn et al. | |
| 5,350,645 A | 9/1994 | Lake et al. | |
| 5,396,177 A | 3/1995 | Kuo et al. | |
| 5,558,961 A | 9/1996 | Doeff et al. | |
| 5,747,190 A | 5/1998 | Lake | |
| 5,785,830 A | 7/1998 | Foos et al. | |
| 5,851,506 A | 12/1998 | Zheng et al. | |
| 5,865,859 A | 2/1999 | Lake | |
| 5,894,403 A | 4/1999 | Shah et al. | |
| 5,919,587 A | 7/1999 | Mukherjee et al. | |
| 5,920,455 A | 7/1999 | Shah et al. | |
| 5,926,362 A | 7/1999 | Muffoletto et al. | |
| 6,004,359 A | 12/1999 | Lake | |
| 6,022,505 A | 2/2000 | Rauscher et al. | |
| 6,030,721 A | 2/2000 | Lake | |
| 6,097,588 A | 8/2000 | Zheng et al. | |
| 6,182,340 B1 | 2/2001 | Bishop | |
| 6,219,222 B1 | 4/2001 | Shah et al. | |
| 6,224,985 B1 | 5/2001 | Shah et al. | |
| 6,231,993 B1 | 5/2001 | Stephenson et al. | |
| 6,271,162 B1 | 8/2001 | Haug et al. | |
| 6,316,142 B1 | 11/2001 | Delnick et al. | |
| 6,334,879 B1 | 1/2002 | Muffoletto et al. | |

(Continued)

*Primary Examiner*—Scott B. Geyer
*Assistant Examiner*—Kyoung Lee
(74) *Attorney, Agent, or Firm*—Michael F. Scalise

(57) ABSTRACT

Deposition of a metal-containing reagent solution or suspension onto a conductive substrate by various pad-printing techniques is described. The result in a pseudocapacitive oxide coating, nitride coating, carbon nitride coating, or carbide coating having an acceptable surface area for incorporation into an electrolytic capacitor, such as one have a tantalum anode.

20 Claims, 34 Drawing Sheets

U.S. PATENT DOCUMENTS

| | | |
|---|---|---|
| 6,399,233 B1 | 6/2002 | Milliken et al. |
| 6,468,605 B2 | 10/2002 | Shah et al. |
| 6,687,117 B2 | 2/2004 | Liu et al. |
| 6,740,420 B2 | 5/2004 | Muffoletto et al. |
| 2002/0064476 A1* | 5/2002 | Omori et al. ................. 419/61 |

* cited by examiner

USE OF POLY(ALKYLENE) CARBONATES IN THE MANUFACTURE OF VALVE METAL ANODES FOR ELECTROLYTIC CAPACITORS

BACKGROUND OF THE INVENTION

1. Field of the Invention

The present invention generally relates to the production of devices that convert chemical energy into electrical energy. More particularly, the present invention relates to pad printing processes for coating an electrode active reagent solution or suspension on a conductive substrate. Preferably, the reagent solution or suspension is of a cathode active material, such as of a ruthenium-containing compound, for an electrolytic capacitor. The ruthenium-containing compound is provided as a printable ink comprising an aqueous or non-aqueous carrier, and a binder, preferably a poly(alkylene) carbonate binder. The present invention also relates to using poly(alkylene) carbonates as a binder in a pressed valve metal anode for an electrolytic capacitor.

2. Prior Art

Electrodes with high specific surface areas result in specific capacitance in the hundreds of $\mu F/cm^2$. Such electrodes are then appropriate when used as the anode and/or cathode in an electrochemical capacitor and as the cathode in an electrolytic capacitor, which require high specific capacitances.

An anode or cathode in an electrochemical capacitor or the cathode in an electrolytic capacitor generally includes a substrate of a conductive metal, such as titanium or tantalum, provided with a pseudocapacitive oxide coating, nitride coating, carbon nitride coating, or carbide coating. In the case of a ruthenium oxide cathode, the active material is formed on the substrate by coating a suspension or dissolved solution of ruthenium oxide or a precursor thereof, such as ruthenium chloride or ruthenium nitrosyl nitrate. The thusly-coated substrate is then heated to a temperature sufficient to evaporate the solvent and, if applicable, convert the precursor, to provide a highly porous, high surface area pseudocapacitive film of ruthenium oxide on the substrate.

The prior art describes various methods of contacting the substrate with the pseudocapacitive reagent solution. For example, Shah et al. and Muffoletto et al. in U.S. Pat. Nos. 5,894,403, 5,920,455, 5,926,362, 6,224,985, 6,334,879 and 6,468,605, all of which are assigned to the assignee of the present invention and incorporated herein by reference, describe coating a ruthenium-containing reagent solution to a conductive substrate by ultrasonic spraying. Ultrasonic spraying is an improvement over other commonly used techniques including dipping, pressurized air atomization spraying, and deposition of a sol-gel onto the substrate. Capacitance values for electrodes made by these latter techniques are lower in specific capacitance than those made by ultrasonic spraying. It is also exceptionally difficult to accurately control the coating morphology due to the controllability and repeatability of the dipping, pressurized air atomization spraying, and sol-gel deposition techniques, which directly impacts capacitance. While the coating morphology is generally good with an ultrasonically spray deposited coating, this technique has problems with over-spray, which impacts production costs, especially when the active material is relatively expensive, such as ruthenium.

Therefore, while ultrasonically spraying an active reagent solution onto a substrate is an improvement in comparison to other known deposition processes that provide capacitors with acceptable energy storage capacities; there is a need to further improve production yields that are negatively impacted by wasteful overspray. Increased production yields result by coating an active reagent solution or suspension onto a conductive substrate using a pad printing technique.

SUMMARY OF THE INVENTION

The present invention describes the deposition of a metal-containing reagent solution or suspension onto a conductive substrate by various pad-printing techniques. This results in a pseudocapacitive oxide coating, nitride coating, carbon nitride coating, or carbide coating having an acceptable surface area commensurate with that obtained by ultrasonically spraying, but with increased yields because over-spray is not a concern. Other advantages include coating thickness uniformity, better adhesion and sustained long-term performance when stored at high temperature during accelerated life test.

In a pad-printing process, the printing ink contains the ruthenium-containing reagent dissolved or well dispersed in a stable suspension. In either case, the system requires an aqueous or non-aqueous carrier. The ink is printed onto a conductive substrate that is then heated to evaporate the solvent, remove the binder, and in some cases, convert the reagent to the desired ruthenium compound. The binder is a viscosity modifier to aid in processing the reagent ink and in the pad printing process. Upon heating to evaporate the solvent and, if applicable, convert the ruthenium-containing precursor to provide the desired ruthenium coating, the binder burns off leaving very small quantities of residual carbon. Excessive residual carbon effects performance of the electrolytic capacitor.

The present poly(alkylene) carbonates are also useful as binders in a dry pressed valve metal powder anode, such as of pressed tantalum powder.

These and other objects of the present invention will become increasingly more apparent to those skilled in the art by a reading of the following detailed description in conjunction with the appended drawings.

DETAILED DESCRIPTION OF THE PREFERRED EMBODIMENTS

The present invention will be described with respect to various pad-printing techniques for depositing or coating reagent ink containing an active material, or precursor thereof, onto a substrate. The pad printing techniques include those performed by sealed ink cup pad printing, open inkwell pad printing and rotary gravure pad printing.

Figure 6:
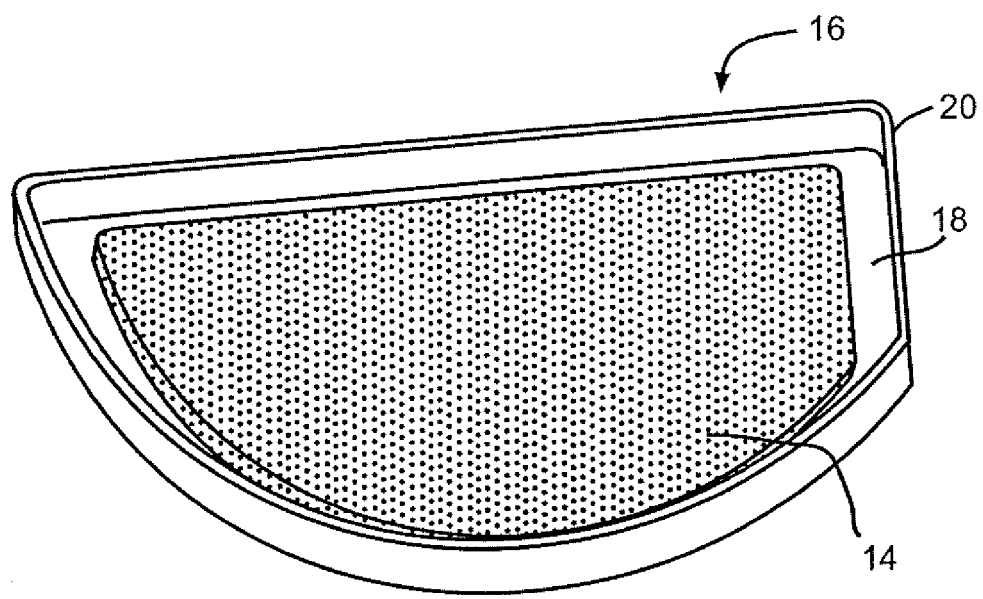
FIG. 6 is a perspective view of the inked substrate.
Figure 6A:
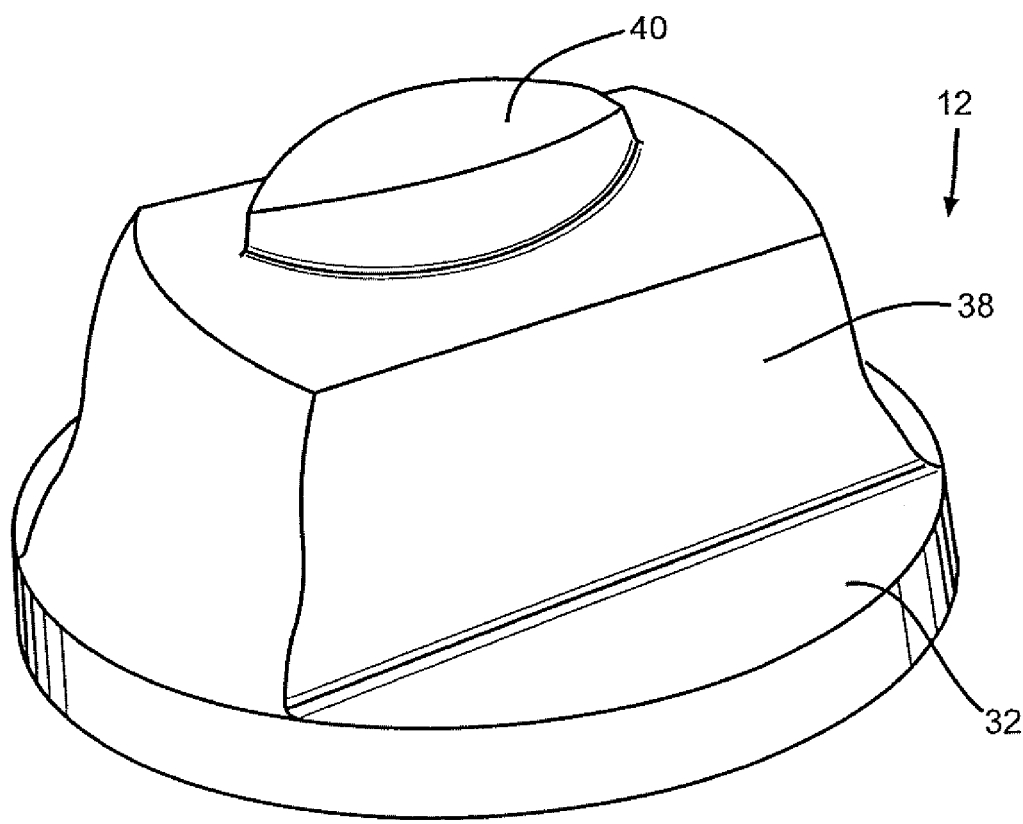
FIG. 6A is a perspective view of the printing tampon.

Turning now to the drawings, FIGS. 1 to 5 illustrate a first embodiment of a sealed ink cup pad printing apparatus 10 using a printing tampon 12 (FIG. 6A) for precisely and evenly contacting an ink 14 of a reagent solution or suspension to a substrate. The substrate can be planar or a shaped member as a casing portion 16 (FIG. 6). The reagent ink solution or suspension is made up of an aqueous or non-aqueous carrier and an organic binder. Suitable solvents include terpineol (boiling point=220° C.), butyl carbitol (b.p.=230° C.), cyclohexanone (b.p.=155.6° C.), n-octyl alcohol (b.p.=171° C.), ethylene glycol (b.p.=197° C.), glycerol (b.p.=290° C.) and water. These are relatively high bonding point solvents that do not evaporate at room temperature and maintain rheology or viscosity during printing.

Suitable salts and dispersible compounds include nitrates, sulfates, halides, acetates, and phosphates to produce the active material being an oxide, nitride, carbide or carbon nitride of ruthenium, cobalt, manganese, molybdenum, tungsten, tantalum, iron, niobium, iridium, titanium, zirconium, hafnium, rhodium, vanadium, osmium, palladium, platinum, nickel, and lead.

A preferred reagent precursor for a ruthenium oxide coating is a ruthenium halide, ruthenium nitrate, ruthenium acetate, or ruthenium sulfate, or an organic salt. In that respect, suitable precursors include the soluble salts of ruthenium(III) chloride hydrate, ruthenium(III) nitrosyl nitrate, nitrosyl ruthenium(III) acetate, ruthenium(III) nitrosylsulfate, and ammonium hexachlororuthenium(III). These miscible precursors are capable of being mixed in the above solvents in any ratio without separation into two phases. Ruthenium dioxide on the other hand forms a dispersion with these solvents, which precludes use of the precursor compounds.

The reagent solution may include a second or more metals. The second metal is in the form of an oxide, or precursor thereof. The second metal is selected from one or more of the group consisting of tantalum, titanium, nickel, iridium, platinum, palladium, gold, silver, cobalt, molybdenum, manganese, tungsten, iron, zirconium, hafnium, rhodium, vanadium, osmium, niobium, and mixtures thereof. In a preferred embodiment of the invention, the reagent solution comprising the ink 14 includes oxides of ruthenium and tantalum, or precursors thereof.

The reagent ink 14 is preferably at a concentration of from about 150 to about 500 grams of the reagent compounds per liter.

The reagent ink 14 further includes a binder. Suitable binders include ethyl cellulose, acrylic resin, polyvinyl alcohol, polyvinyl butyral and a poly(alkylene carbonate) having the general formula R—O—C(=O)—O with R=C1 to C5. Poly(ethylene carbonate) and poly(propylene carbonate) are preferred. It is critical to use a very low ash content binder in electrical energy storage systems. Poly(alkylene carbonate) binders burn out of the reagent ink in any atmosphere including nitrogen, air, hydrogen, argon and vacuum, leaving only very small quantities of carbon (6.9 ppm per ASTM D482). Suitable poly(aklylene carbonate) binders are commercially available from Empower Materials, Inc., Newark, Del. under the designations QPAC 25 and QPAC 40.

The substrate 16 preferably consists of a conductive metal such as titanium, molybdenum, tantalum, niobium, cobalt, nickel, stainless steel, tungsten, platinum, palladium, gold, silver, copper, chromium, vanadium, aluminum, zirconium, hafnium, zinc, iron, and mixtures and alloys thereof, and comprises a bottom wall 18 supporting a surrounding sidewall 20 forming an opening leading therein. It is through this opening that the printing tampon 12 moves to deposit the reagent ink 14 onto of the substrate casing portion 16 in a specifically designed pattern dictated by the capacitor (not shown) to be constructed. In general, the thickness of the substrate is in the range of about 0.001 millimeters to about 2 millimeter, and preferably about 0.1 millimeters.

Regardless of the material of the substrate 16, coating integrity relies mostly upon mechanical bonding to the contacted surface. It is, therefore, critical that the substrate 16 is properly prepared to ensure coating quality. For one, substrate surface cleanliness is very important in all coating systems. In that respect, it is required that the substrate 16 remain uncontaminated by lubricants from handling equipment or body oils from hands, and the like. Substrate cleaning includes chemical means such as conventional degreasing treatments using aqueous and non-aqueous solutions as are well known to those skilled in the art. Plasma cleaning is also used.

After substrate surface cleaning, surface roughness is the next most critical factor for coating adhesion. The bottom wall 18 may be roughened by chemical means, for example, by contacting the substrate with hydrofluoric acid and/or hydrochloric acid containing ammonium bromide and methanol, and the like, by plasma etching, and by mechanical means such as scraping, machining, wire brushing, rough threading, grit blasting, a combination of rough threading then grit blasting and abrading such as by contacting the substrate with Scotch-Brite® abrasive sheets manufactured by 3M.

If desired, the electrical conductivity of the substrate 16 is improved prior to coating. Metal and metal alloys naturally have a native oxide on their exposed surfaces. This is a resistive layer and hence, if the material is to be used as a substrate for a capacitor electrode, the oxide is preferably removed or made electrically conductive prior to deposition of an active coating thereon. In order to improve the electrical conductivity of the substrate 16, various techniques can be employed. One is shown and described in U.S. Pat. No. 6,740,420 to Muffoletto et al., which is assigned to the assignee of the present invention and incorporated herein by reference.

The sealed ink cup pad printing apparatus 10 comprises a main frame 22 having a platform 24 to which is fixed a vertical support beam 26 and a cantilevered arm 28. A generally C-shaped plate 30 is secured to the platform, vertical beam and cantilevered arm to add support to the main frame. The printing tampon 12 depends from the cantilevered arm 28 for actuation in a relative upwardly and downwardly vertical direction towards and away from the arm.

The printing tampon 12 comprises a backing plate 32 detachably secured to a piston 34 at the distal end of a piston rod 36. The printing tampon 12 is more clearly shown in FIG. 6A comprising the backing plate 32 supporting a polymeric main body 38 provided with an extending pad portion 40. The pad portion 40 is shown as a curved surface, but when it is deformed by contact with the substrate 16, it assumes the desired peripheral shape.

The piston rod 36 resides in a closely spaced relationship in a cylinder 42 that precisely controls the axis of vertical movement of the piston 34 and attached printing tampon 12. A limit plate 44 is secured to the piston rod 36 adjacent to the piston 34. This ensures that the piston does not retract upwardly too far to be damaged by a collision with the C-shaped plate 30 and cantilevered arm.

The mainframe platform 24 supports a cliché 46 that actuates in a back and forth manner on a series of upper and lower bearings 48 and 50, respectively. The cliché 46 is a plate shaped metal member, such as of A2 tool steel coated with a diamond like carbon finish. The cliché has a chemically etched recess 52 sized to create the image or perimeter of the reagent ink 14 to be deposited on the substrate 16. A cup 54 containing the reagent ink 14 is supported on the cliché 46 by a magnetic sealing ring 56. The magnetic attraction between the cliché and ring provides a closely spaced tolerance that squeegees the reagent ink 14 filled into the recess 52 to a precise depth. The reagent ink 14 is now ready for subsequent transfer to the printing tampon 12 as the cliché 46 travels back and forth. This will be described in greater detail hereinafter.

Figure 1:
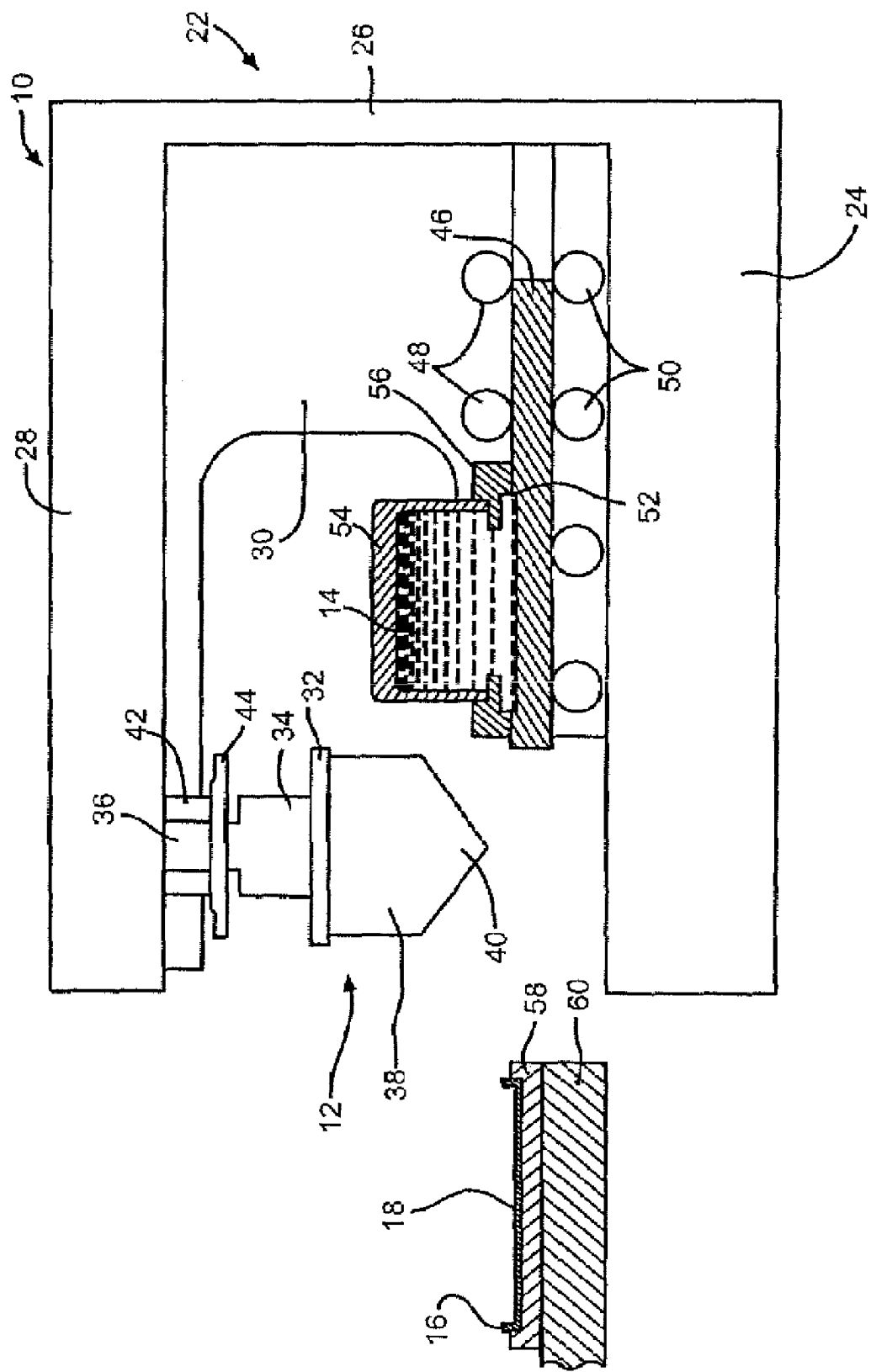
FIG. 1 is a schematic view of a first embodiment of a sealed ink cup pad printing apparatus 10 of the present invention showing a printing tampon 12, substrate 16, cliché 46 and reagent ink cup 54 prior to the start of a cycle.

As shown in FIG. 1, the sealed ink cup printing process according to this first embodiment of the present invention begins with the substrate 16 resting on a block 58 that may be thermally conductive, which in turn is supported on a work stage 60. The work stage 60 is preferably temperature controlled and provides for movement of the block 58. In that manner, the block conducts heat to the substrate 16 to maintain it at a temperature sufficient to solidify and, if applicable, convert the reagent ink to the desired active material. The block 58 can also be left at ambient for room temperature processing. For a more detailed description of this heating and conversion process, reference is made to the previously discussed U.S. Pat. Nos. 5,894,403, 5,920,455, 5,926,362, 6,224,985, 6,334,879 and 6,468,605.

Alternatively, a conductive substrate (not shown) that is not a casing portion is supported on the conductive block. In that case, the conductive substrate will be generally planar and contacted to the casing portion after being coated with the reagent ink converted to the solidified active material, as will be described in detail hereinafter with respect to FIGS. 24 to 27.

As shown in the drawing of FIG. 1, a pad printing cycle of the first embodiment begins with the cliché 46 in a retracted position having its recess 52 directly aligned with the ink cup 54 magnetically sealed thereto by the ring 56.

Figure 2:
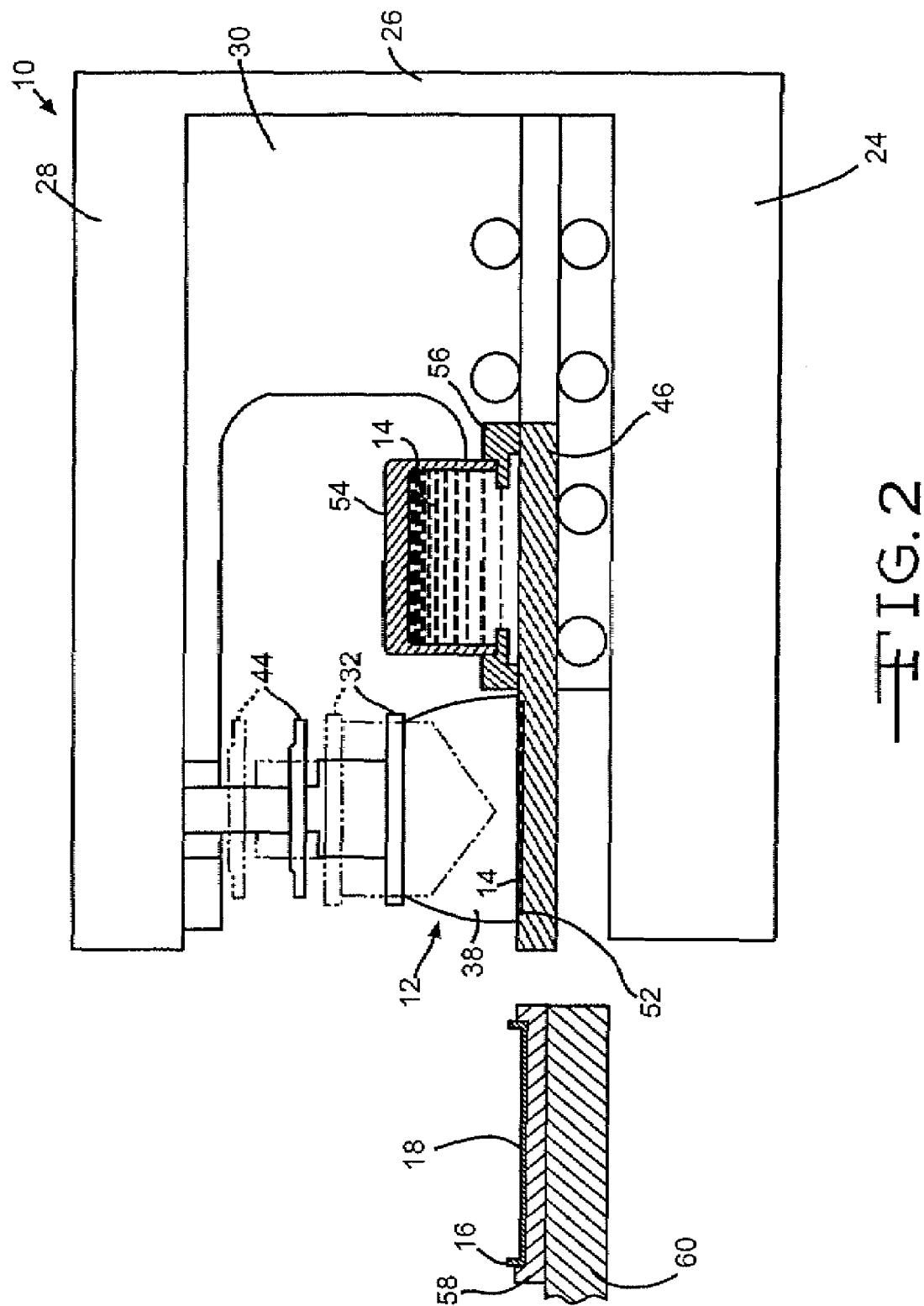
FIG. 2 is a schematic view of the pad printing apparatus 10 with reagent ink 14 filled in the recess 52 of the cliché and the printing tampon contacting the ink.

In FIG. 2, the cliché has moved to the left such that the reagent ink 14 filled in the recess 52 is completely free of the ink cup 54 and in a precise vertical alignment with the retracted printing tampon 12. The piston 34 is then actuated to move the printing tampon 12 in a downwardly direction to have the extended pad portion 40 contact and pick up the ink 14 onto its printing surface. As previously discussed, the extending pad portion 40 has a curved surface, which helps prevent splashing the ink 14 as the printing tampon 12 is moved into contact with the substrate. In that respect, downward actuation of the printing tampon 12 continues until the pad portion 40 has deformed into the recess 52 to pick up the reagent ink 14 deposited therein.

Figure 3:
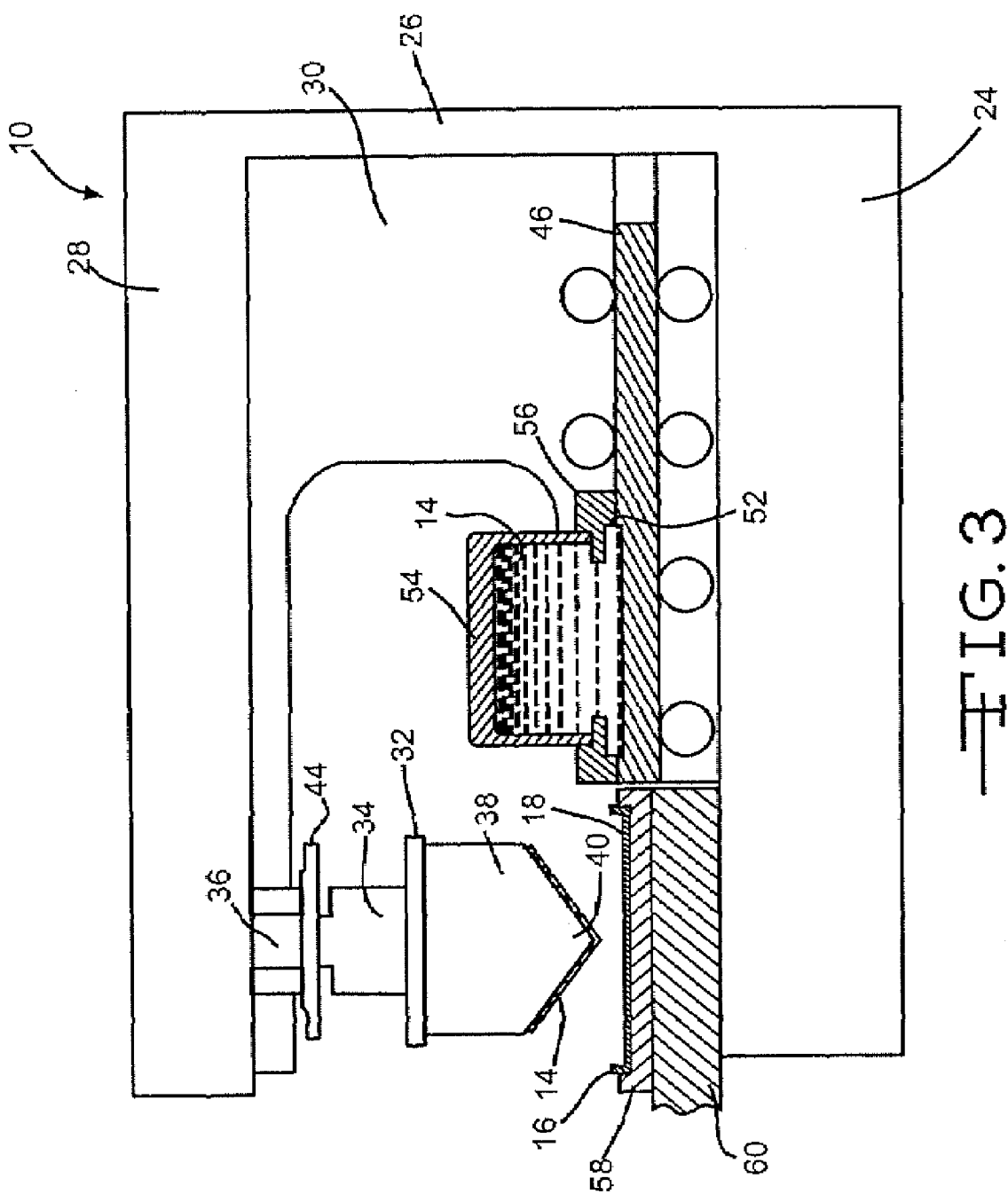
FIG. 3 is a schematic view of the pad printing apparatus 10 with the inked printing tampon positioned vertically above the substrate 16.

As shown in FIG. 3, the inked printing tampon 12 then retracts into a raised position as the cliché 46 is simultaneously retracted away from vertical alignment with the substrate 16. The recess 52 of the cliché 46 is once again aligned with the ink cup 54 for filling another charge of reagent ink therein. As this occurs, the work stage 60 is simultaneously actuated to move into a position with the conductive block 58 supporting the substrate 16 directly aligned beneath the inked printing tampon 12.

Figure 4:
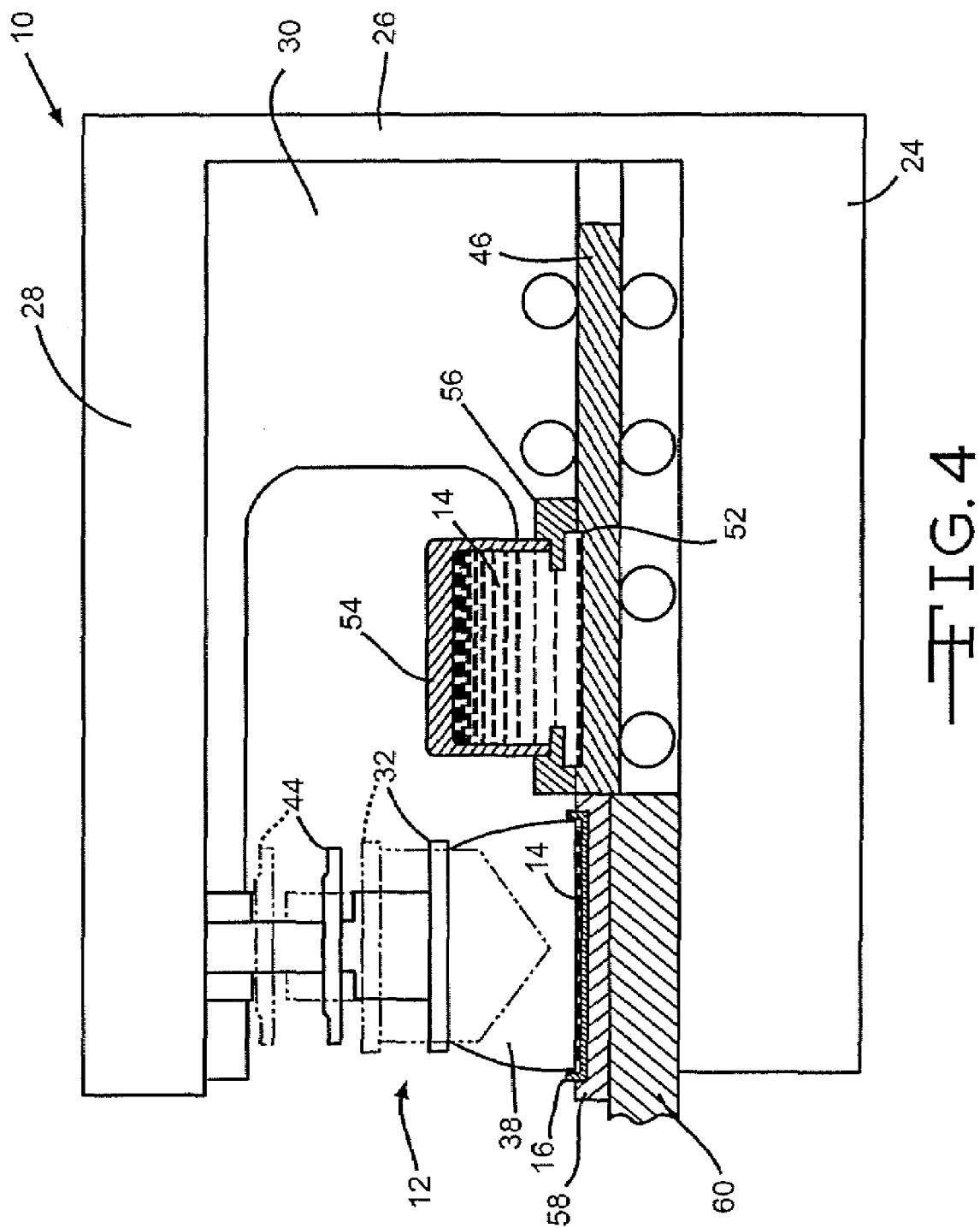
FIG. 4 is a schematic view of the pad printing apparatus 10 with the inked printing tampon contacting the substrate.
Figure 5:
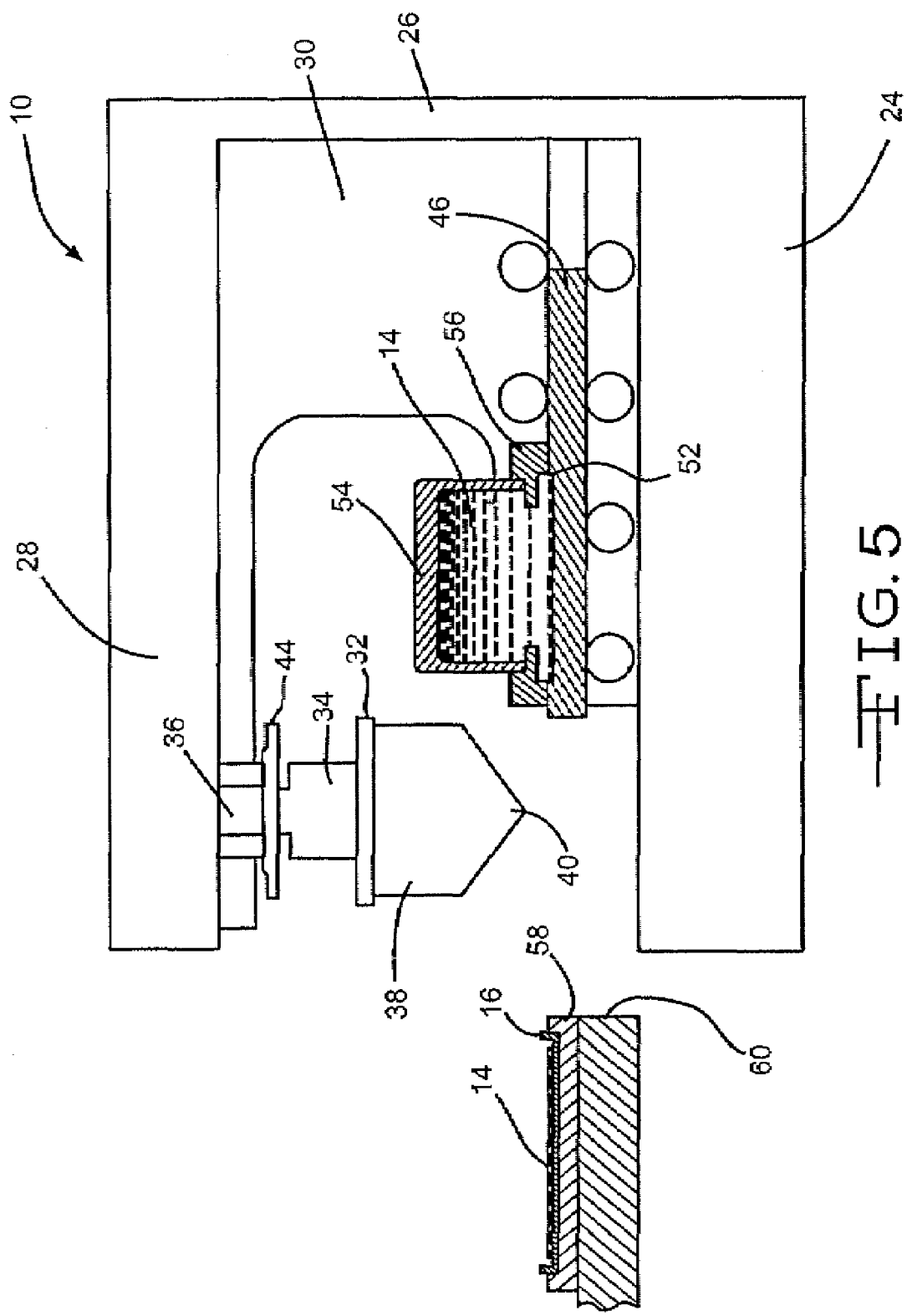
FIG. 5 is a schematic view of the pad printing apparatus 10 before the inked substrate is moved to a further processing step.

In FIG. 4, the printing tampon 12 is actuated in a downwardly direction to contact the bottom wall 18 of the substrate 16 with its inked pad portion 40. As this occurs, the pad portion 40 deforms to completely contact the area of the substrate bottom wall 18 to be coated with the reagent ink. The surface tension of the reagent ink contacting the bottom wall 18 is greater than the surface tension of the ink contacting the pad portion 40 of the printing tampon. In that manner, the reagent ink 14 is deposited onto the casing portion bottom wall 18 when the printing tampon 12 moves into the retracted position of FIG. 5. The work stage 60 also retracts into its starting position.

During deposition of the reagent ink 14 onto the bottom wall 18 of the substrate 16, the conductive block 58 and work stage 60 maintain the substrate at a temperature sufficient to evaporate or otherwise drive off the solvent from the deposited reagent mixture. In addition, printing can be done at ambient temperature and with solvent removal performed in a subsequent process. As will be described in detail hereinafter, the coated substrate is then subjected to a separate heating step to convert the precursor to the oxide and to diffuse the deposited ions into the substrate for proper bonding or adhesive strength. This heating step is in addition to heating the substrate to evaporate the solvent.

Thus, as the casing portion 16 is being coated with the reagent ink, the bottom wall 18 is at a temperature sufficient to begin driving off or otherwise evaporating the solvent material. If desired, this can be performed at ambient. Preferably, the solvent is evaporated from the substrate 16 almost instantaneously with contact by the reagent ink 14 resulting in deposition of a relatively thin film coating of the cathode active material, or precursor thereof. In the case of an aqueous solution, the substrate is heated to a first temperature of at least about 100° C. to instantaneously evaporate the solvent from the deposited reagent solution. More preferably, as the deposition of the reagent ink is taking place, the substrate is heated to the first temperature of up to about 220° C. A higher first temperature results in a greater solvent evaporation rate. A thin film is defined as one having a thickness of about 1 micron and less.

In the case where the product active material is intended to be a ruthenium-containing oxide compound, the deposited nitrate, sulfate, acetate, chloride, or phosphate precursor is heated to a temperature sufficient to burn off the binder and convert the reagent ink to a highly porous, high surface area pseudocapacitive film. Typical heating times are from about five minutes to about six hours.

For example, after deposition and solvent removal, the precursor-coated substrate is heated to a second temperature of about 300° C. to about 500° C., preferably about 350° C., for at least about five minutes to about three hours. A final heating temperature of at least about 300° C. is preferred to substantially completely decompose and burn off the binder from the pseudocapacitive film. Residual binder by-products are known to affect capacitance in a negative manner.

This is only one heating protocol for converting a reagent precursor to a ruthenium-containing oxide. It is contemplated that ruthenium-containing oxides may be formed by a step heating protocol, as long as the last heating is at least about 300° C., and more preferably about 350° C., for at least about five minutes.

Alternatively, after the initial deposition heating, the temperature of the substrate 16 is slowly and steadily ramped up, for example, at about 1° C./minute, preferably about 6° C./min. until the temperature reaches at least about 300° C. to about 500° C., and more preferably about 350° C. The substrate is then maintained at the maximum temperature for a time sufficient to allow conversion of the precursor to its final form as a ruthenium-containing oxide and to sufficiently diffuse the active material into the substrate 16. Heating at 300° C., and more preferably at about 350° C. is for about five minutes or longer.

In another embodiment, the substrate 16 is maintained at a temperature sufficient to, for all intents and purposes, instantaneously convert the precursor to a porous, high surface area product active coating on the substrate. More particularly, as the precursor reagent ink is deposited, the substrate is at a temperature of about 100° C. to about 500° C., preferably at least about 200° C., and more preferably about 300° C., and still more preferably about 350° C., to instantaneously convert the precursor to the desired product. The coating is heated for an additional time to ensure complete conversion and binder burn out.

The decomposition temperature is about 220° C. for the previously described poly(ethylene carbonate) binder and about 250° C. for the poly(propylene carbonate) binder. Therefore, the minimum final heating temperatures must exceed these temperatures to ensure complete combustion of the binder into non-toxic by-products, primarily of carbon dioxide and water.

After deposition and conversion of the precursor to the product active coating, whether it is instantaneous or otherwise, the substrate 18 is ramped down or cooled to ambient temperature, maintained at the heated deposition temperature to enhanced bonding strength, or varied according to a specific profile. In general, it is preferred to conduct the heating steps while contacting the substrate with air or an oxygen-containing gas.

In the case of a product porous ruthenium-containing oxide, it is preferred that the resulting coating have a thickness of from about a hundred Angstroms to about 0.1 millimeters, or more. The porous coating has an internal surface area of about 1 $m^2$/gram to about 1,500 $m^2$/gram. Also, a majority of the particles of the porous coating have diameters of less than about 500 nanometers.

While not shown in the drawings, the inked substrate 16 is removed from the conductive block 58 and heated work stage 60 for further processing into an electrical energy storage device, such as a capacitor. A second substrate is then positioned on the conductive block and the cycle is repeated.

FIGS. 7 to 12 illustrate a second embodiment of a sealed ink cup pad printing apparatus 100 according to the present invention. This apparatus includes many of the same components as the apparatus 10 described with respect to FIGS. 1 to 5, and like parts will be provided with similar numerical designations.

Figure 7:
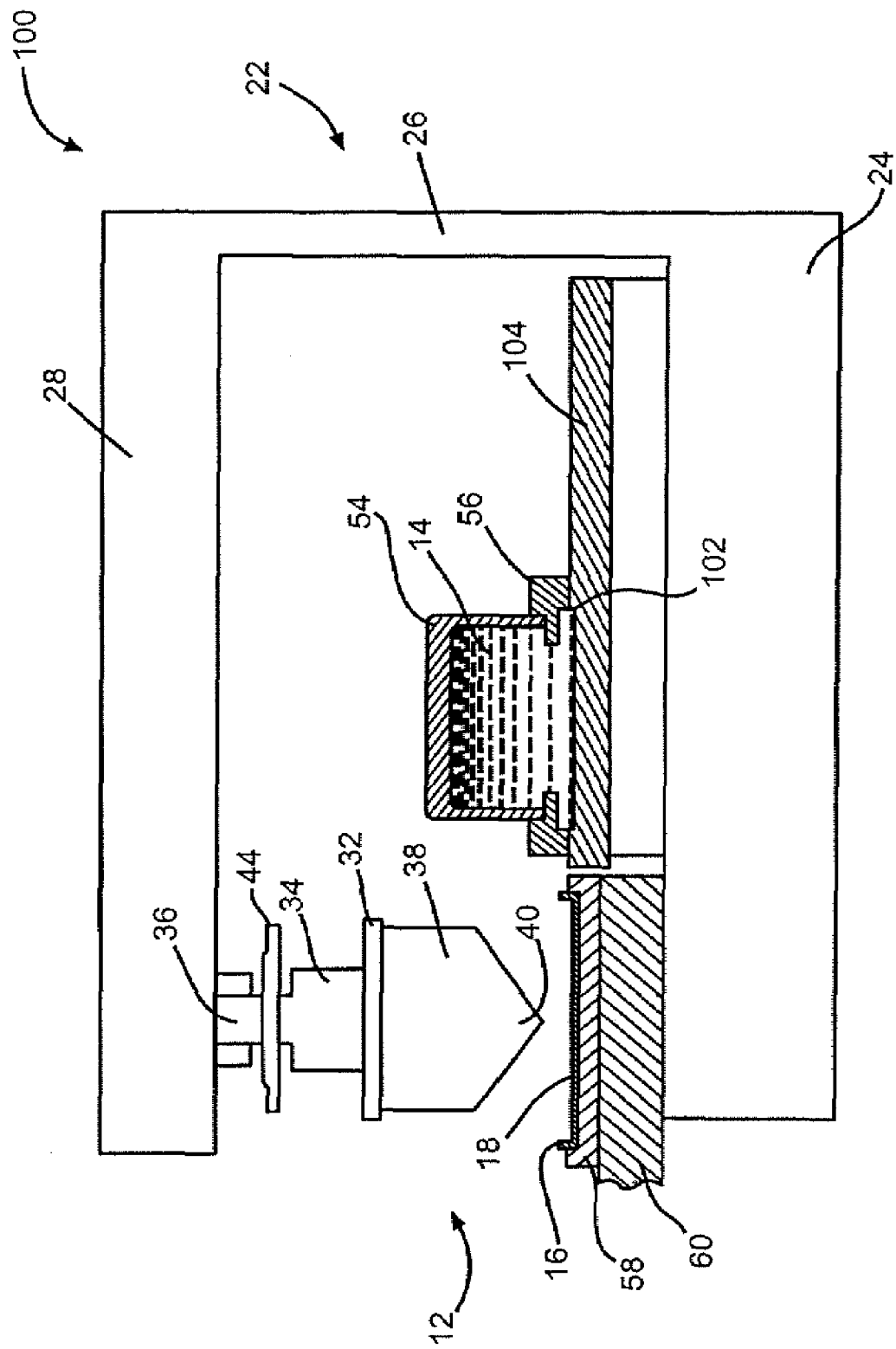
FIG. 7 is a schematic view of a second embodiment of a sealed ink cup pad printing apparatus 100 of the present invention showing the printing tampon 12 positioned vertically above the substrate 16 and with an ink cup 54 filling the reagent ink into the recess 102 of a cliché 104 prior to the start of a cycle.

As particularly shown in FIG. 7, the sealed ink cup pad printing apparatus 100 comprises the main frame 22 having the platform 24 fixed to the vertical beam 26 supporting the cantilevered arm 28. In this embodiment, the printing tampon 12 is not only actuatable in an upwardly and downwardly direction, it is also movable in a forwardly and backwardly direction with respect to the cantilevered arm 28. However, in this embodiment instead of the cliché actuating in a back and forth manner, the ink cup 54 does. In that light, FIG. 7 shows the ink cup 54 aligned with the recess 102 of the stationary cliché 104 to deposit a change of the reagent ink 14 therein. The printing tampon 12 is in a retracted position aligned vertically above the substrate 16 supported on the substrate 58 and work stage 60.

Figure 8:
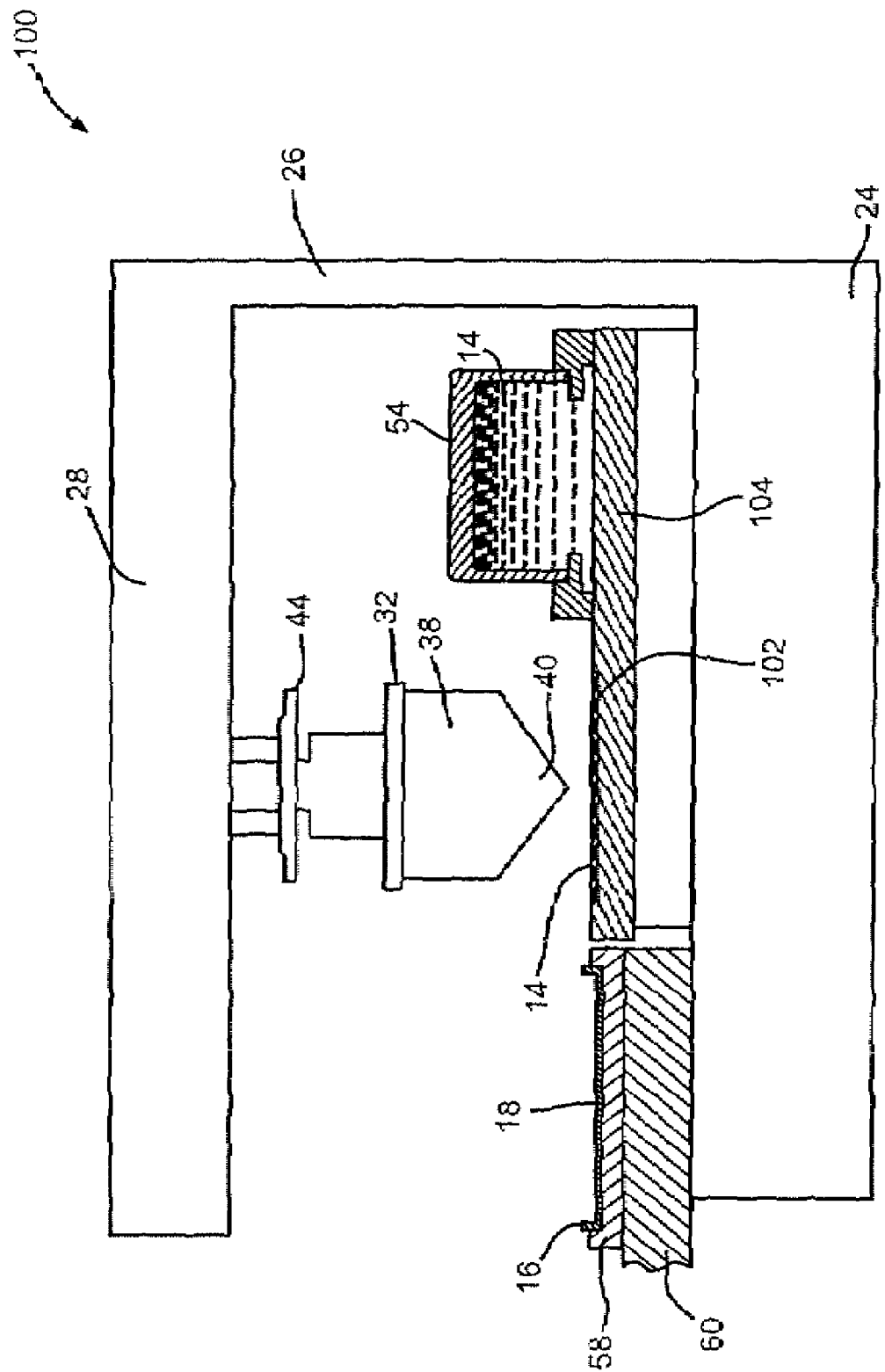
FIG. 8 is a schematic view of the pad printing apparatus 100 with reagent ink 14 filled in the recess of the cliché and the printing tampon positioned vertically above the ink.

In FIG. 8, the ink cup 54 has retracted along the cliché 104 and away from its recess 102 with a charge of reagent ink 14 deposited therein. Likewise, the printing tampon 12 has moved along the cantilevered arm 28 a like distance as the ink cup 54 has moved along the stationary cliché 104. The printing tampon 12 is now positioned vertically above the reagent ink 14 deposited in the cliché recess 102.

Figure 9:
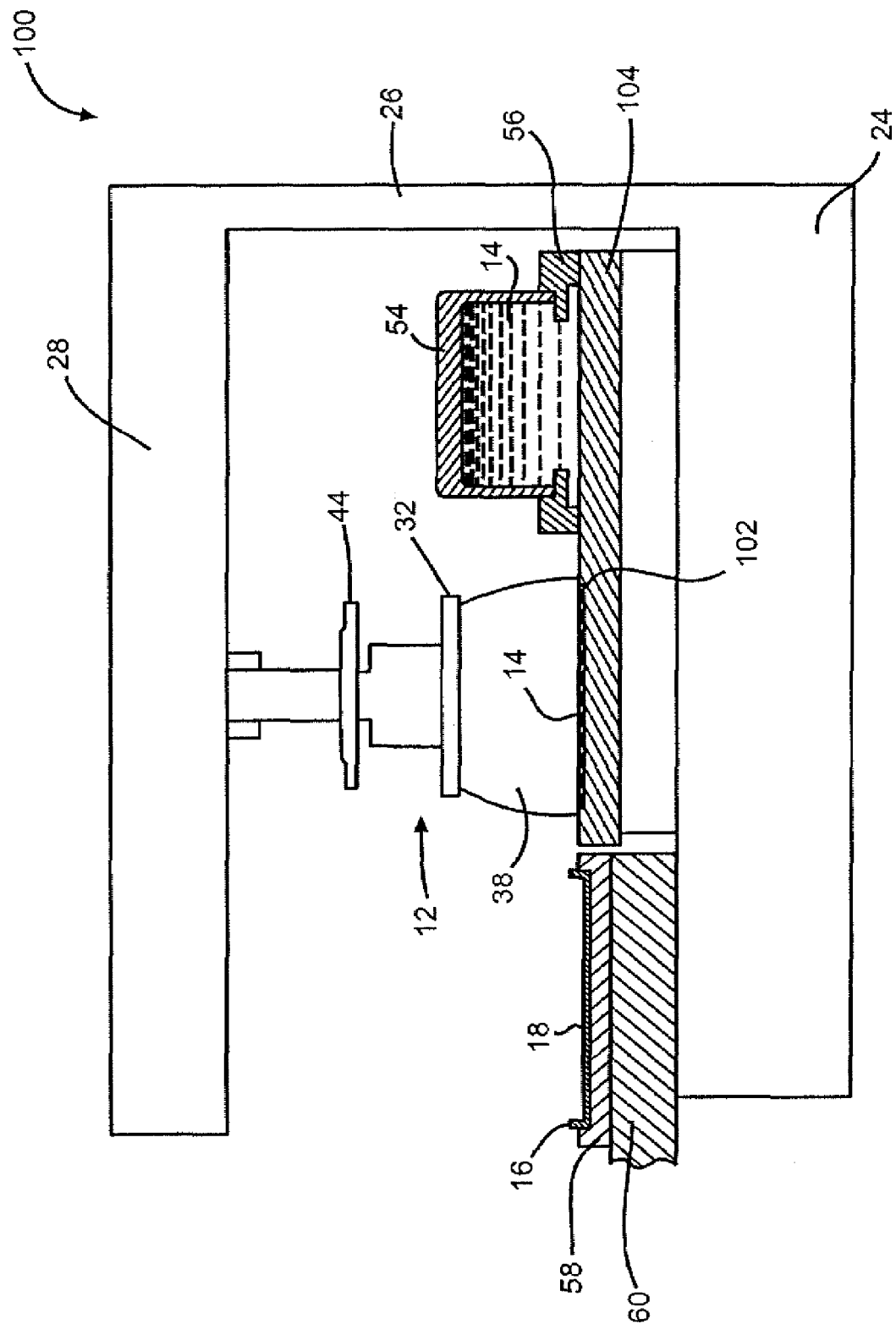
FIG. 9 is a schematic view of the pad printing apparatus 100 with the printing tampon picking up the ink in the cliché recess.
Figure 10:
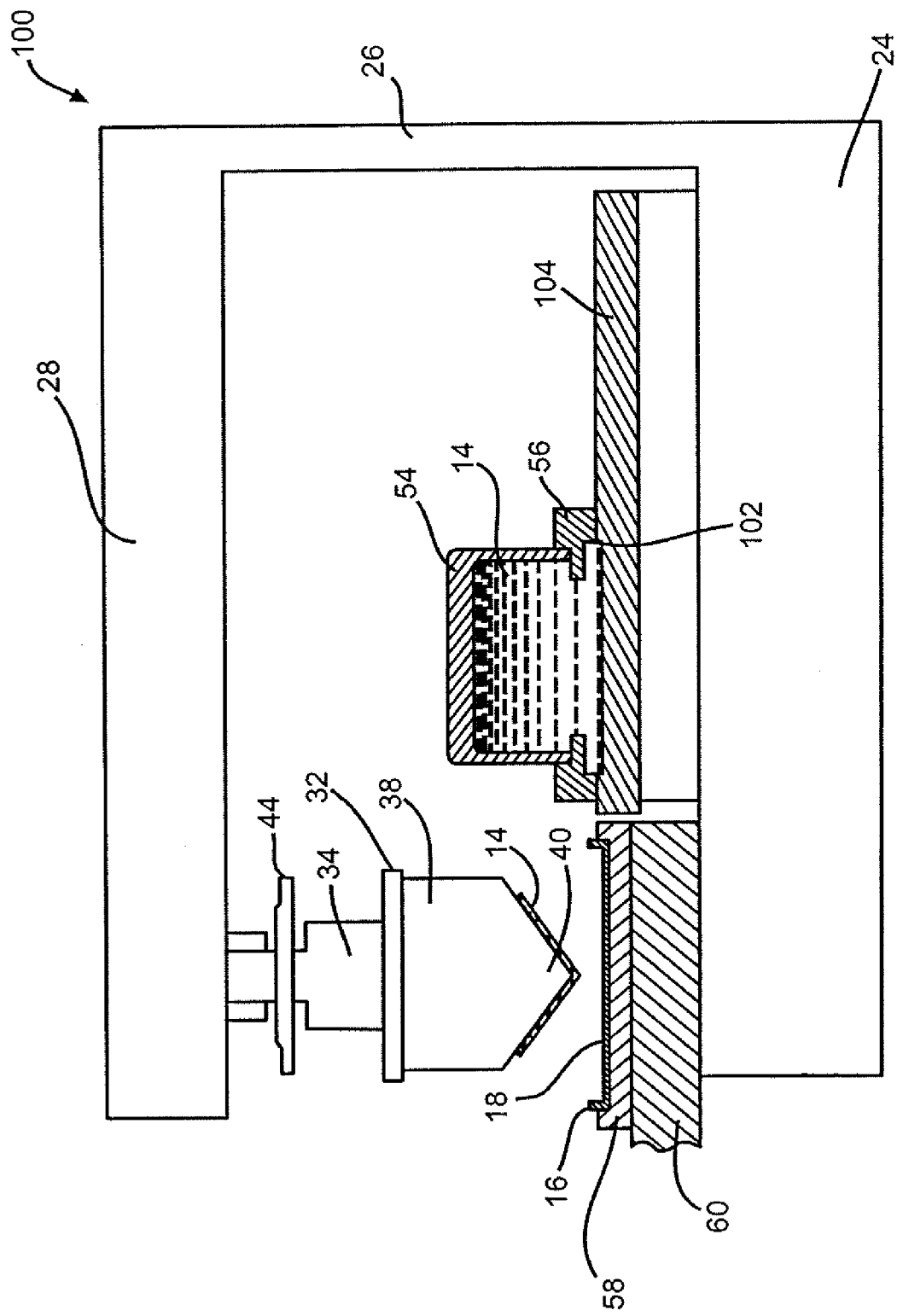
FIG. 10 is a schematic view of the pad printing apparatus 100 with the inked printing tampon positioned vertically above the substrate.

FIG. 9 illustrates the printing tampon 12 having been actuated in a downwardly direction with the pad portion 40 contacting the cliché 104 to pick up the reagent ink 14 contained in the recess thereof. The inked printing tampon 12 then retracts into a raised position as the ink cup 54 is simultaneously actuated into alignment with the recess 102 in the cliché 104 to once again deposit a charge of reagent ink therein. As in the simultaneous movement described in FIG. 8, the printing tampon 12 and ink cup 54 have each moved a like distance in a reverse direction in FIG. 10. The printing tampon 12 is now vertically aligned with the substrate 16 supported on the conductive block 58 and heated work stage 60.

Figure 11:
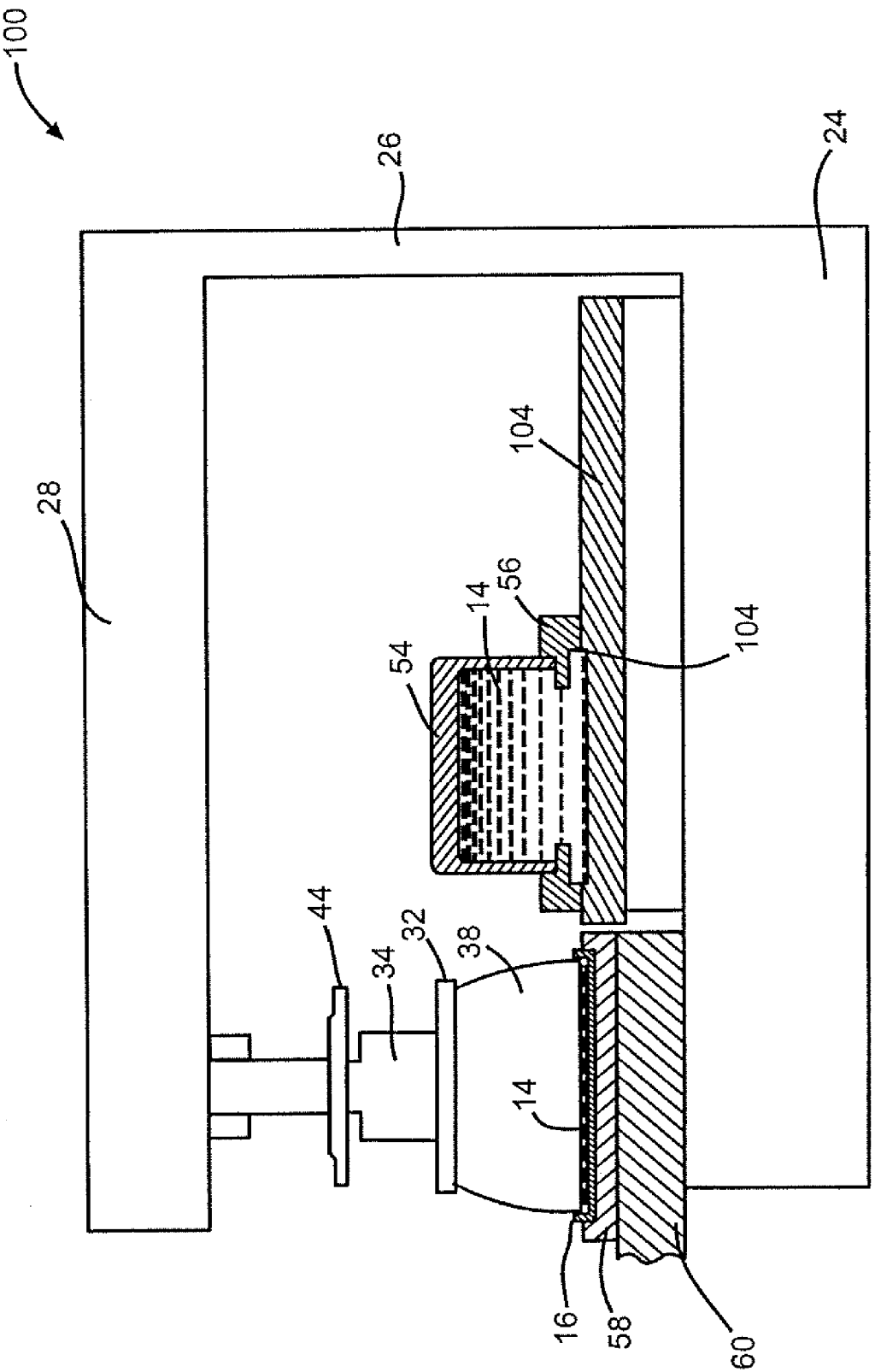
FIG. 11 is a schematic view of the pad printing apparatus 100 with the inked printing tampon contacting the substrate.
Figure 12:
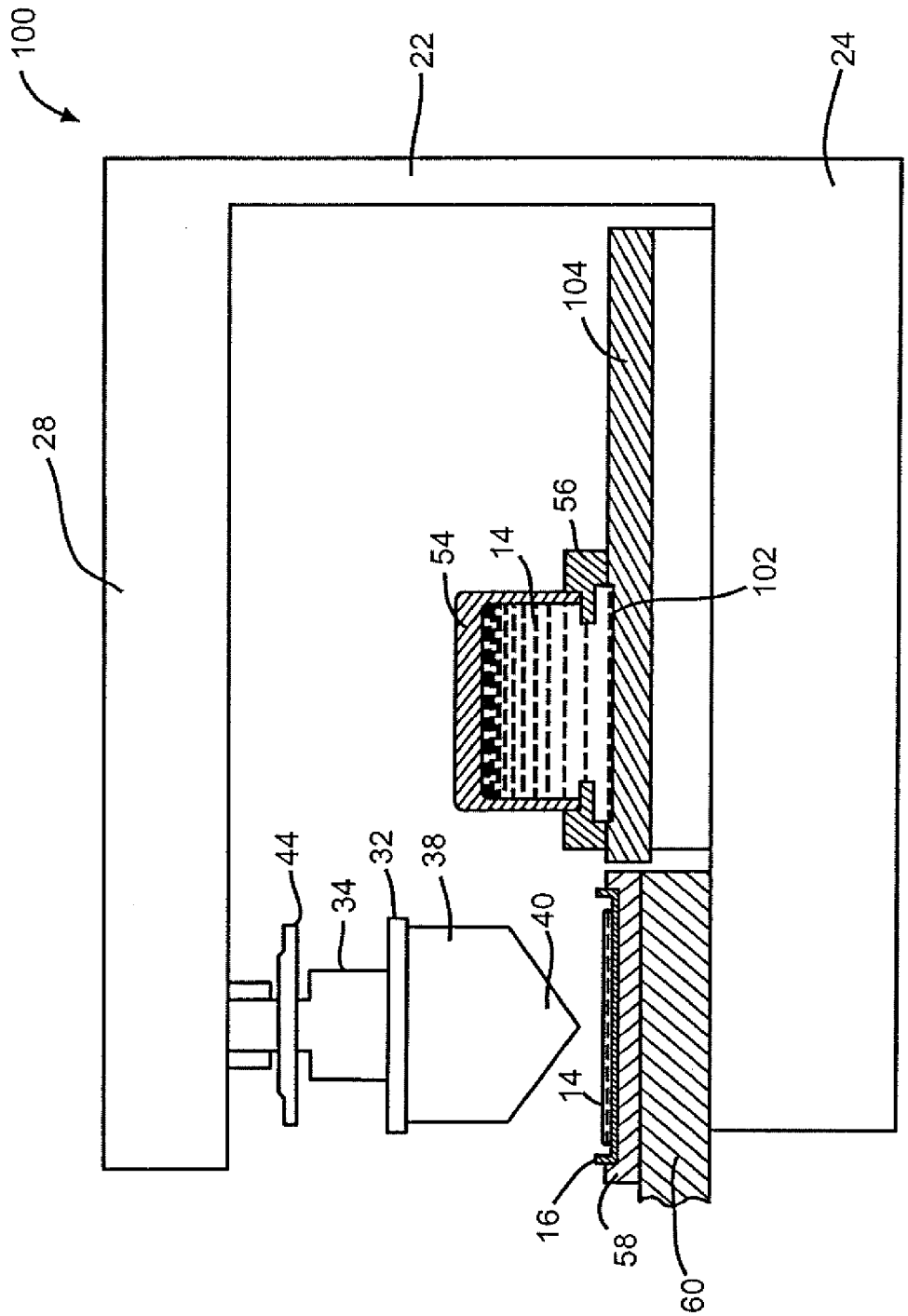
FIG. 12 is a schematic view of the pad printing apparatus 100 before the inked substrate is moved to a further processing step.

FIG. 11 illustrates the printing tampon 12 having been actuated in a downwardly direction to contact the substrate 16. As this occurs, the pad portion 40 deforms to completely contact the area of the substrate bottom wall 18 to be coated with the reagent ink. In that manner, the reagent ink 14 is deposited onto the casing bottom wall 18 when the printing tampon 12 moves into the retracted position of FIG. 12. The inked substrate 16 is then removed from the conductive block 58 and heated work stage 60 for further processing into an electrical energy storage device. A second substrate is positioned on the substrate and the pad printing cycle process is repeated.

FIGS. 13 to 18 illustrate a third embodiment of a sealed ink cup pad printing apparatus 110 according to the present invention. This apparatus includes many of the same components as the apparatuses 10 and 100 described with respect to FIGS. 1 to 5 and 7 to 12, respectively, and like parts will be provided with similar numerical designations.

Figure 13:
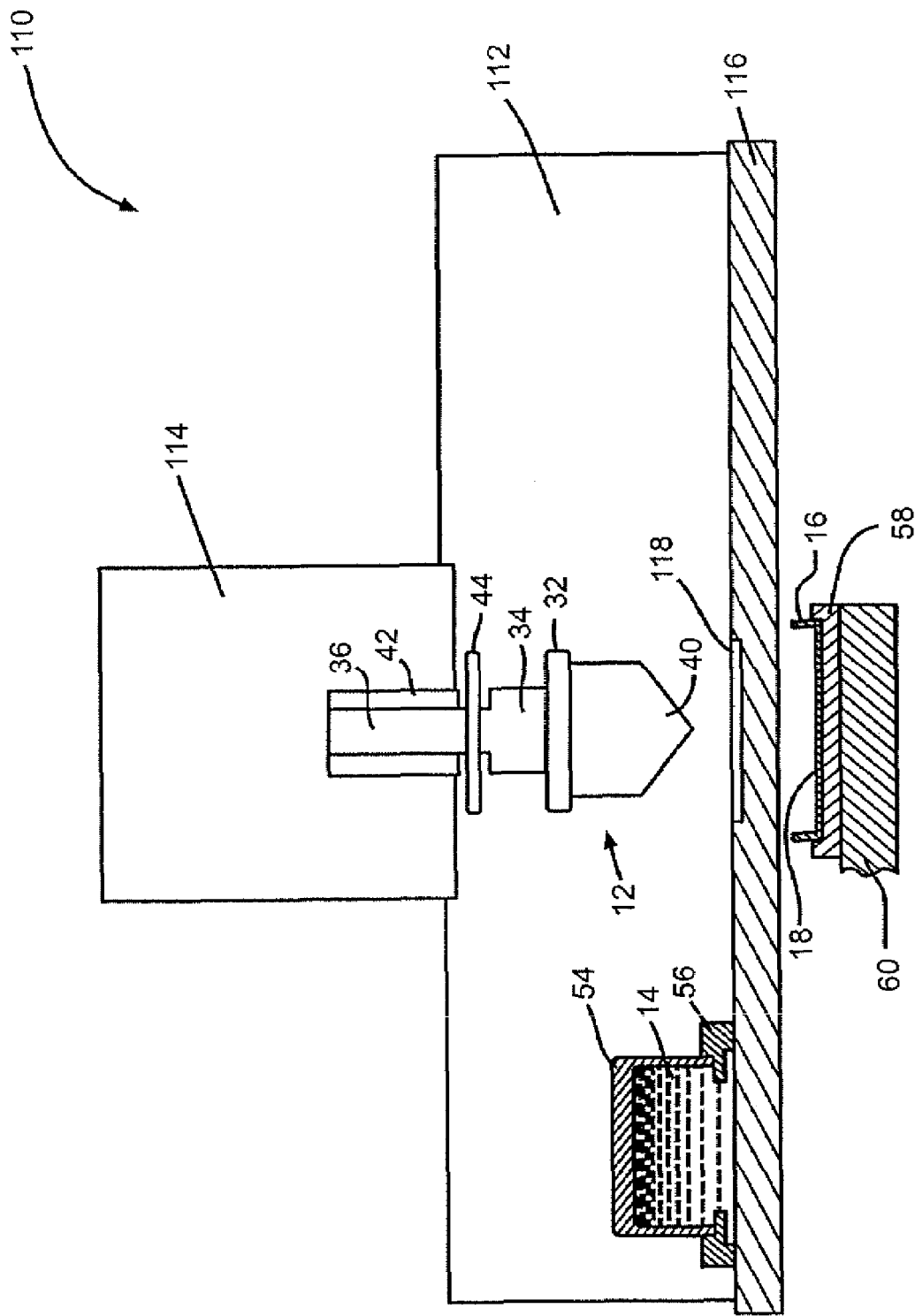
FIG. 13 is a schematic view of a third embodiment of a sealed ink cup pad printing apparatus 110 of the present invention showing the printing tampon 12 positioned vertically above the recess 118 of a cliché 116 prior to the start of a cycle.
Figure 14:
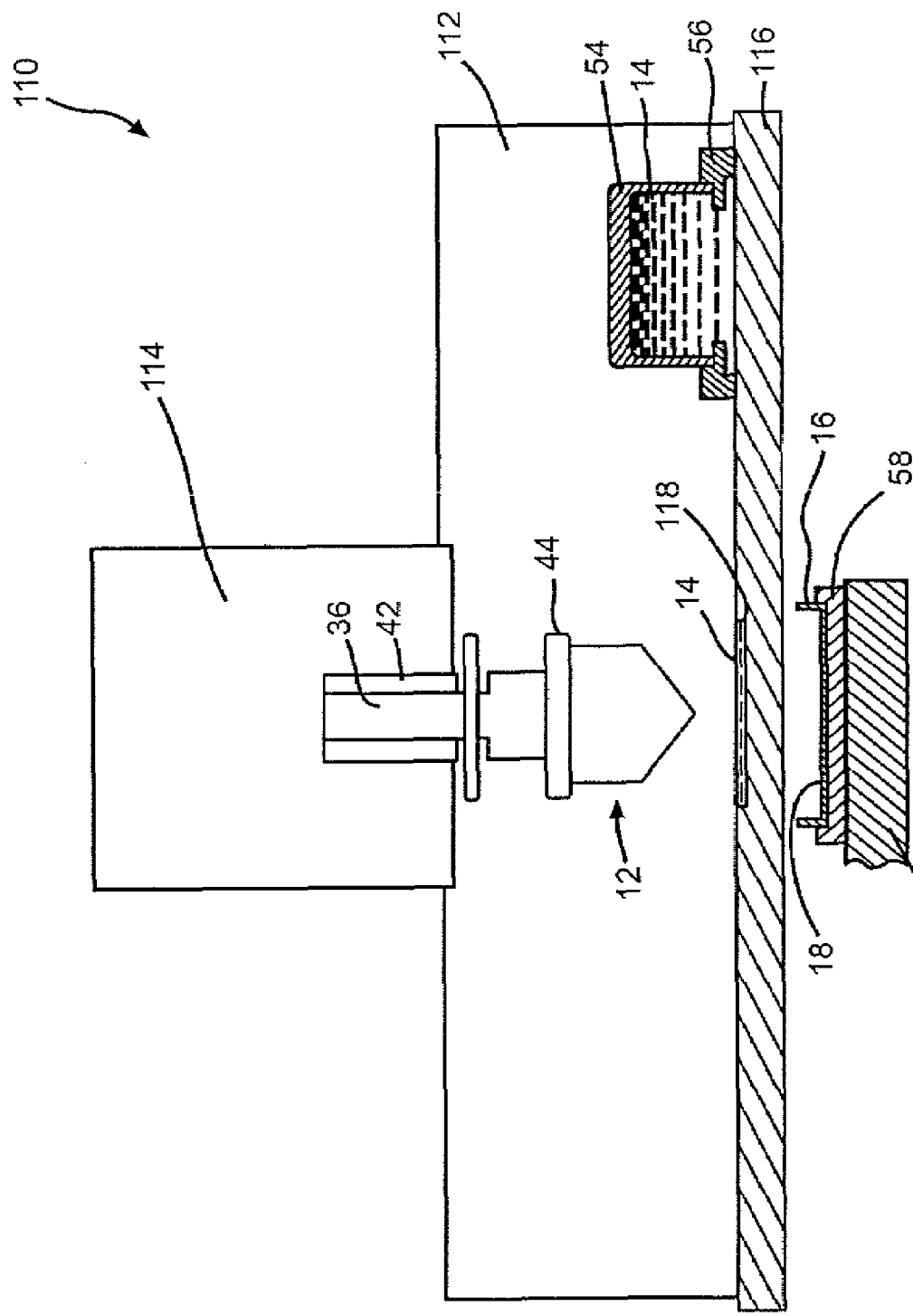
FIG. 14 is a schematic view of the pad printing apparatus 110 with reagent ink 14 filled in the cliché recess and the printing tampon positioned vertically above the ink.

As particularly shown in FIG. 13, the pad printing apparatus 110 comprises a main frame 112 supporting a housing 114 for the piston 34 and piston rod 36 actuatable in an upwardly and downwardly direction along a cylinder 42. A limit plate 44 ensures that the piston 34 does not retract upwardly too far to collide with the housing 114. A printing tampon 12 is detachably secured to the end of the piston 36 by a backing plate 32.

A cliché 116 is connected to the main frame 112 and serves as a stage for backward and forward movement of the ink cup 54 there along. The ink cup 54 is sealed to the cliché 116 by a squeegee ring 56. The cliché 116 includes a recess 118 so that as the ink cup 54 travels back and forth along the cliché 116, the reagent ink 14 is precisely filled into the recess 118 (FIG. 14) for subsequent transfer to the printing tampon 12.

Figure 15:
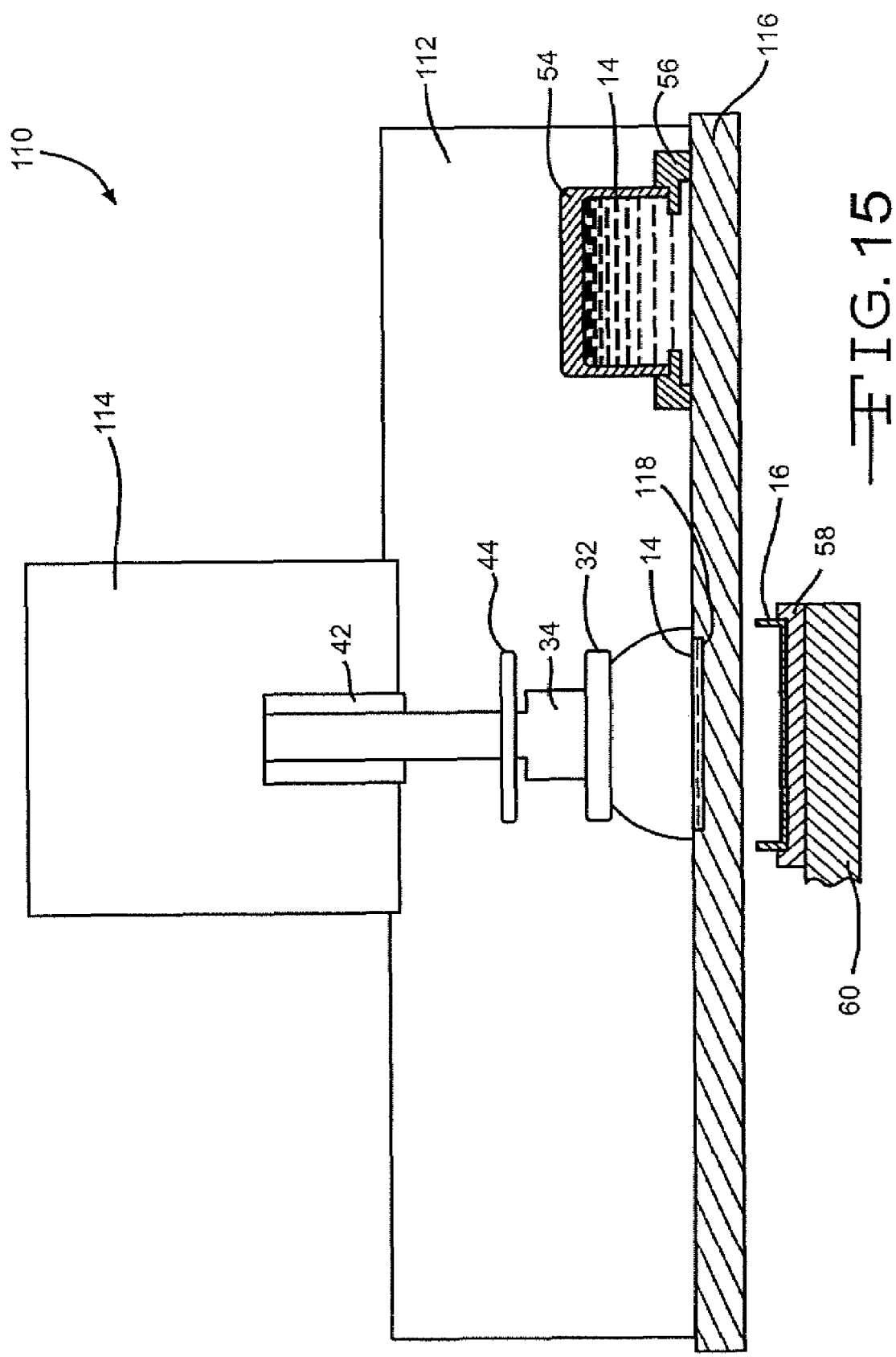
FIG. 15 is a schematic view of the pad printing apparatus 110 with the printing tampon picking up the ink in the cliché recess.
Figure 16:
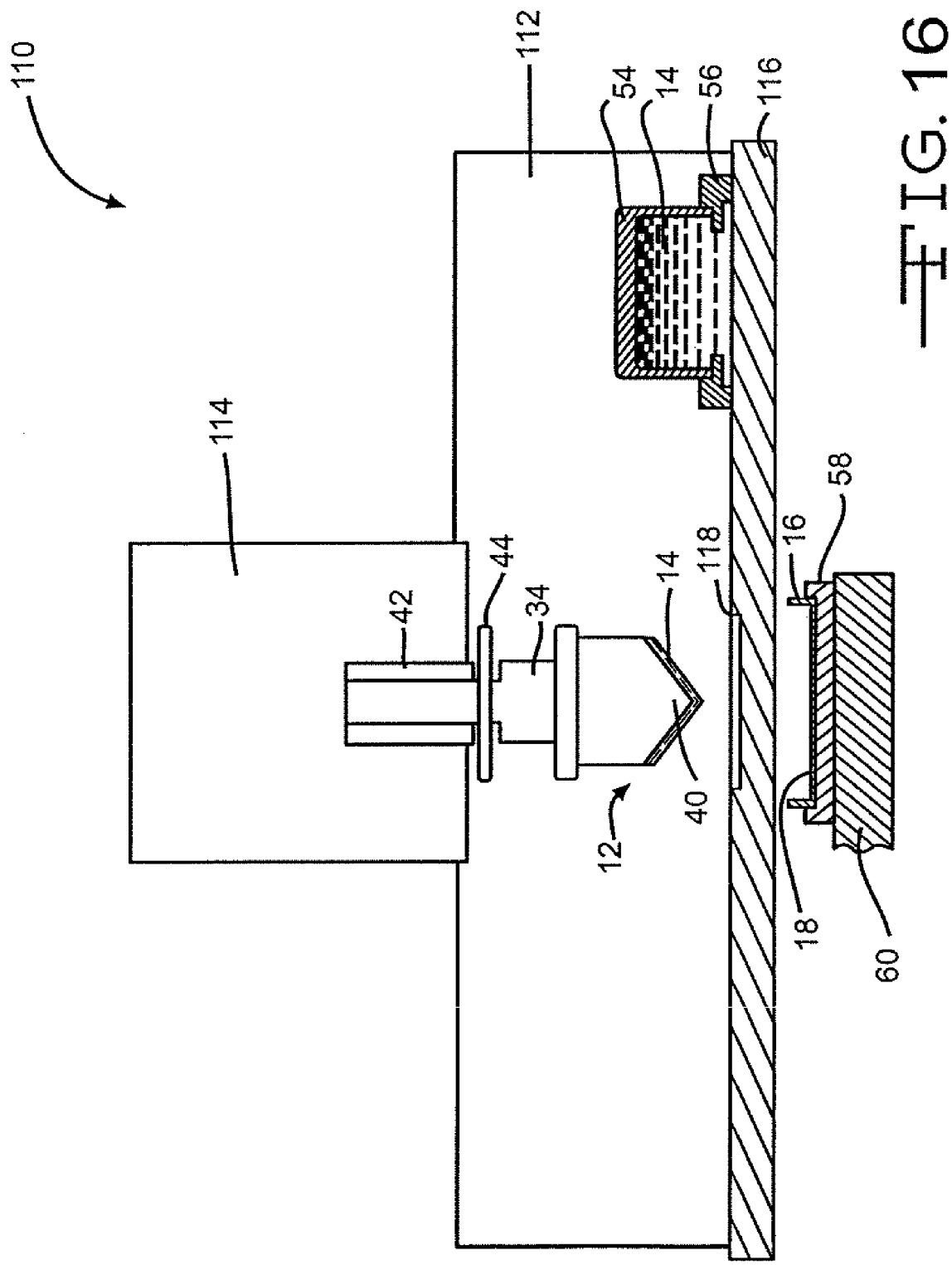
FIG. 16 is a schematic view of the pad printing apparatus 110 with the inked printing tampon positioned vertically above the substrate.

As shown in FIG. 15, once the cliché recess 118 is filled with the reagent ink 14 and the ink cup 54 has moved to a position free of the printing tampon 12, the piston 34 is actuated in a downwardly direction. This moves the printing tampon in a downwardly direction to contact the cliché 116 and pick up the reagent ink 14 onto its extended pad portion 40. The inked printing tampon 12 then retracts into a raised position. The printing tampon 12 is next actuated in a forwardly direction and into vertical alignment with the substrate 16 supported on the conductive block 58 and heated work stage 60. This positioning is shown in FIG. 16.

Figure 17:
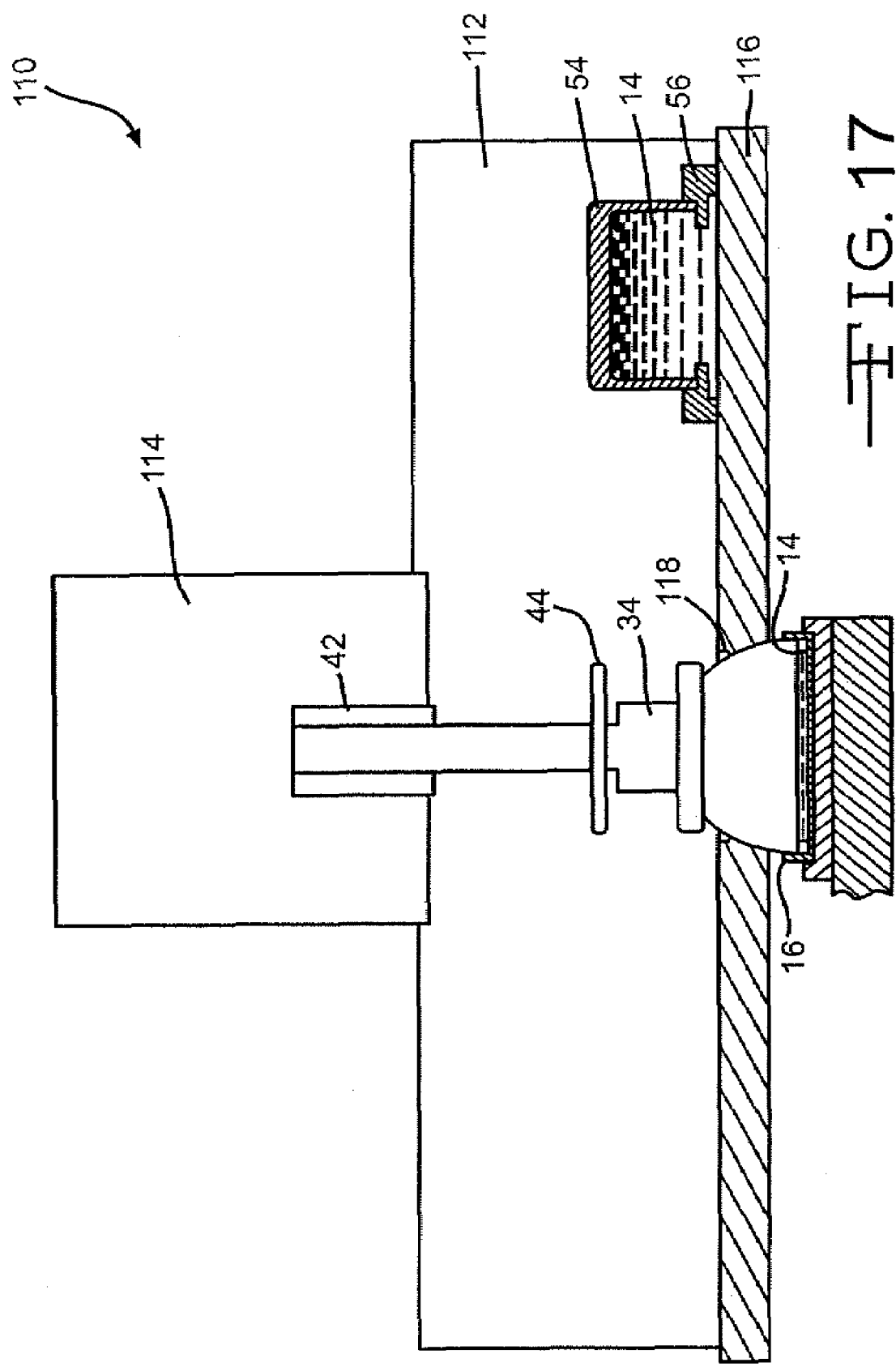
FIG. 17 is a schematic view of the pad printing apparatus 110 with the inked printing tampon contacting the substrate.
Figure 18:
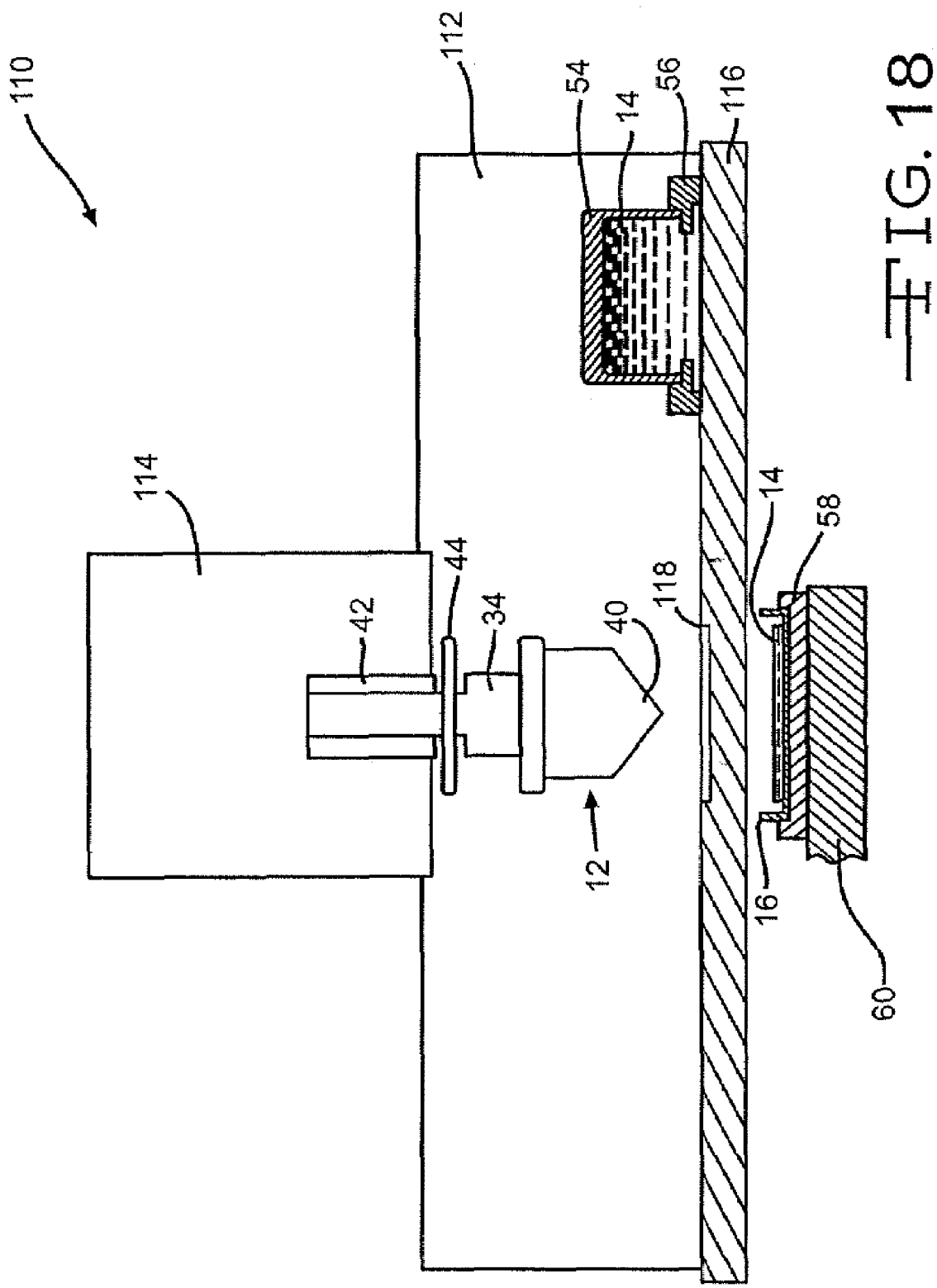
FIG. 18 is a schematic view of the pad printing apparatus 110 before the inked substrate is moved to a further processing step.

FIG. 17 illustrates the printing tampon 12 having been actuated in a downwardly direction to contact the substrate 16. The pad portion 40 deforms to completely contact the area of the casing bottom wall 18 to be coated with the reagent ink. In that manner, the reagent ink 14 is deposited onto the casing bottom wall 18 when the printing tampon 12 moves into the retracted position of FIG. 18. The inked substrate 16 is then removed from the conductive block 58 and heated work stage 60 for further processing into an electrical energy storage device. A second substrate is positioned on the conductive block, and the recess 118 in the cliché 116 is once again precisely filled with the reagent ink 14 as the ink cup 54 and seal 56 travel along the cliché 116 to the position shown in FIG. 13. The printing tampon 12 then cycles to pick up the ink and deposit it onto the substrate as previously described.

In that manner, a cycle of the pad printing apparatus 110 is not complete until the ink cup 54 has traveled back and forth across the cliché 116, filling the recess 118 each time. This benefits cycle time as each movement of the ink cup 54 across the cliché 116 results in an inked substrate.

FIGS. 19 to 23 illustrate a further embodiment of the present invention using an open inkwell pad printing apparatus 200 according to the present invention. The open inkwell pad printing apparatus 200 comprises a cliché 202 having a recess 204 and an inkwell 206 containing reagent ink 14. Mounted vertically above the cliché 202 is a support beam 208 that provides for vertical translation of the printing tampon 12, a squeegee 210 and a doctor blade 212. The squeegee is connected to the support beam by a depending beam 214 having a first actuatable pivot member 216. A secondary arm 218 is axially movable with respect to a rod 220 connected to the pivot member 216. A second actuatable pivot member 222 is at the distal end of the secondary arm 218 and supports the squeegee 210 for rotational movement into and out of contact with the cliché 202.

A horizontal beam 224 is connected to the depending beam 214 with the doctor blade 212 pivotably supported at the distal end of the horizontal beam 224. An actuatable arm 226 connects between the support beam 208 and the secondary arm 218 for precise pivotable movement of the doctor blade 212 into and out of contact with the cliché 202.

Figure 19:
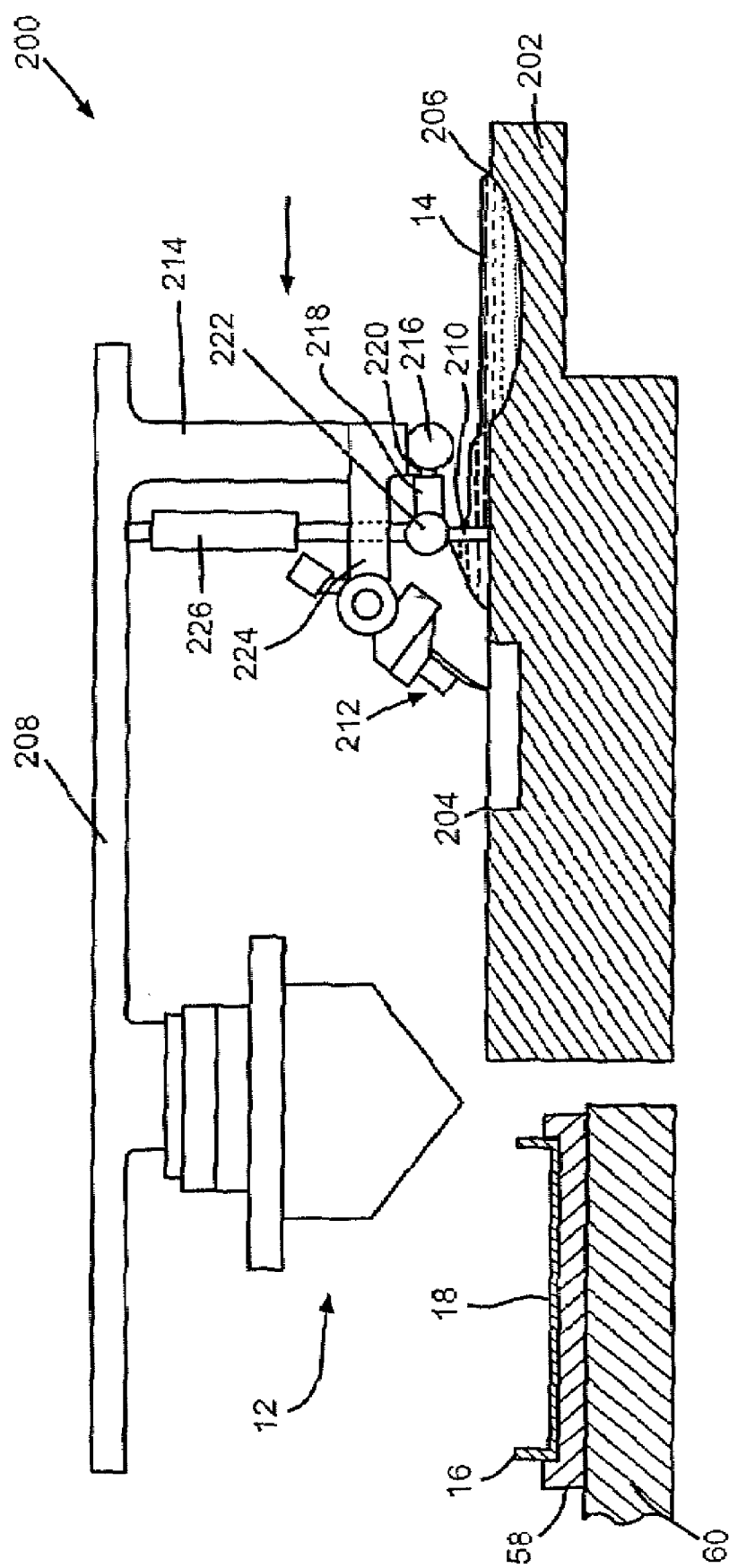
FIG. 19 is a schematic view of an open inkwell pad printing apparatus 200 of the present invention showing a printing tampon 12, substrate 16, cliché 202 and ink well 206 prior to the start of a cycle.
Figure 20:
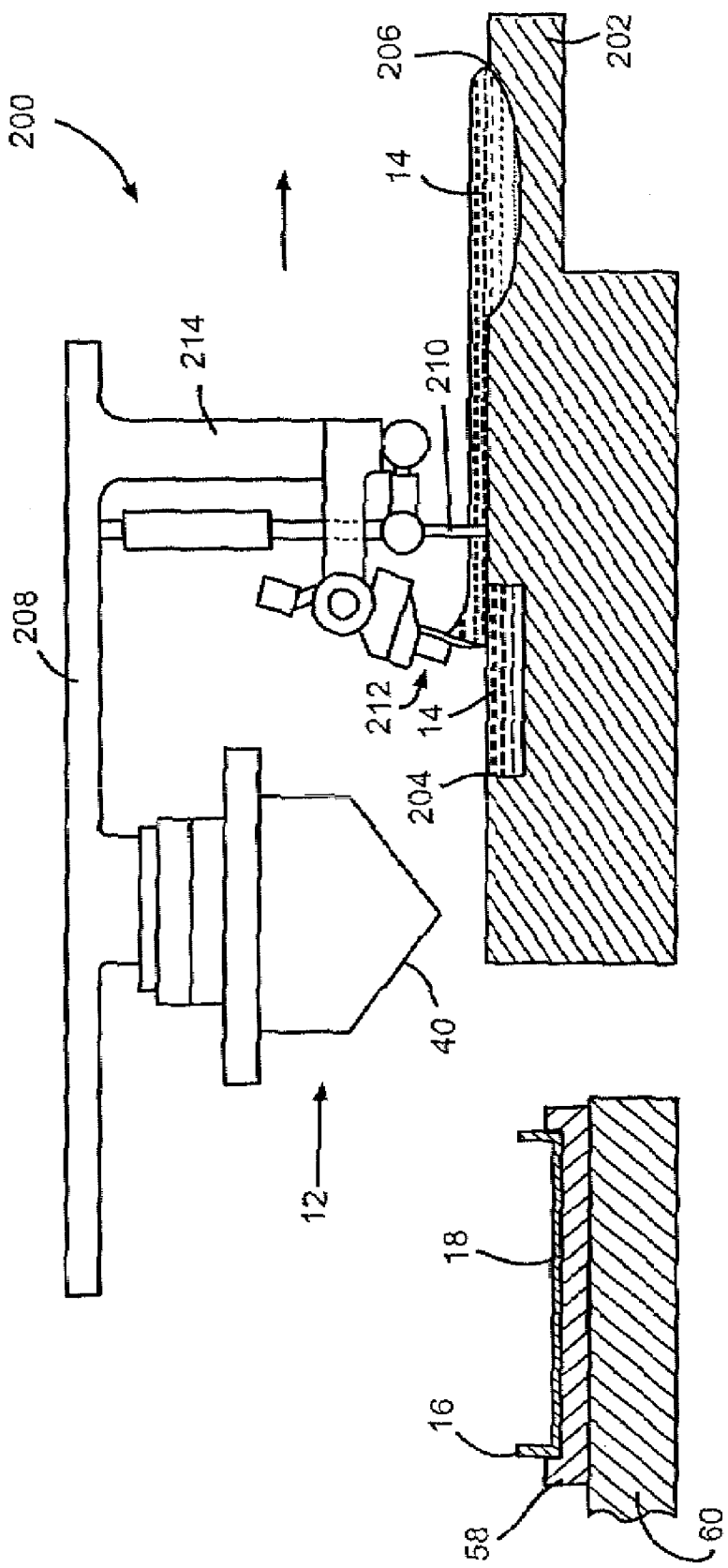
FIG. 20 is a schematic view of the pad printing apparatus 200 with reagent ink 14 filled in the recess 204 of the cliché 202 by a squeegee with excess ink being removed by a doctor blade 212.

As shown in FIG. 19, a pad printing cycle using the open inkwell printing apparatus 200 begins with a quantity of reagent ink 14 filled into the well 206 located in the cliché

202. The squeegee 210 is moved across the inkwell 206 to move a volume of reagent ink 14 onto the upper surface of the cliché 202. The reagent ink 14 flows into the recess 204 as the squeegee travels to the left. After the recess is filled, the doctor blade 212 is moved back over the recess toward the right to skim any excess reagent ink 14 back into the inkwell 206. This provides a precise quantity of reagent ink filled into the recess 204.

Figure 21:
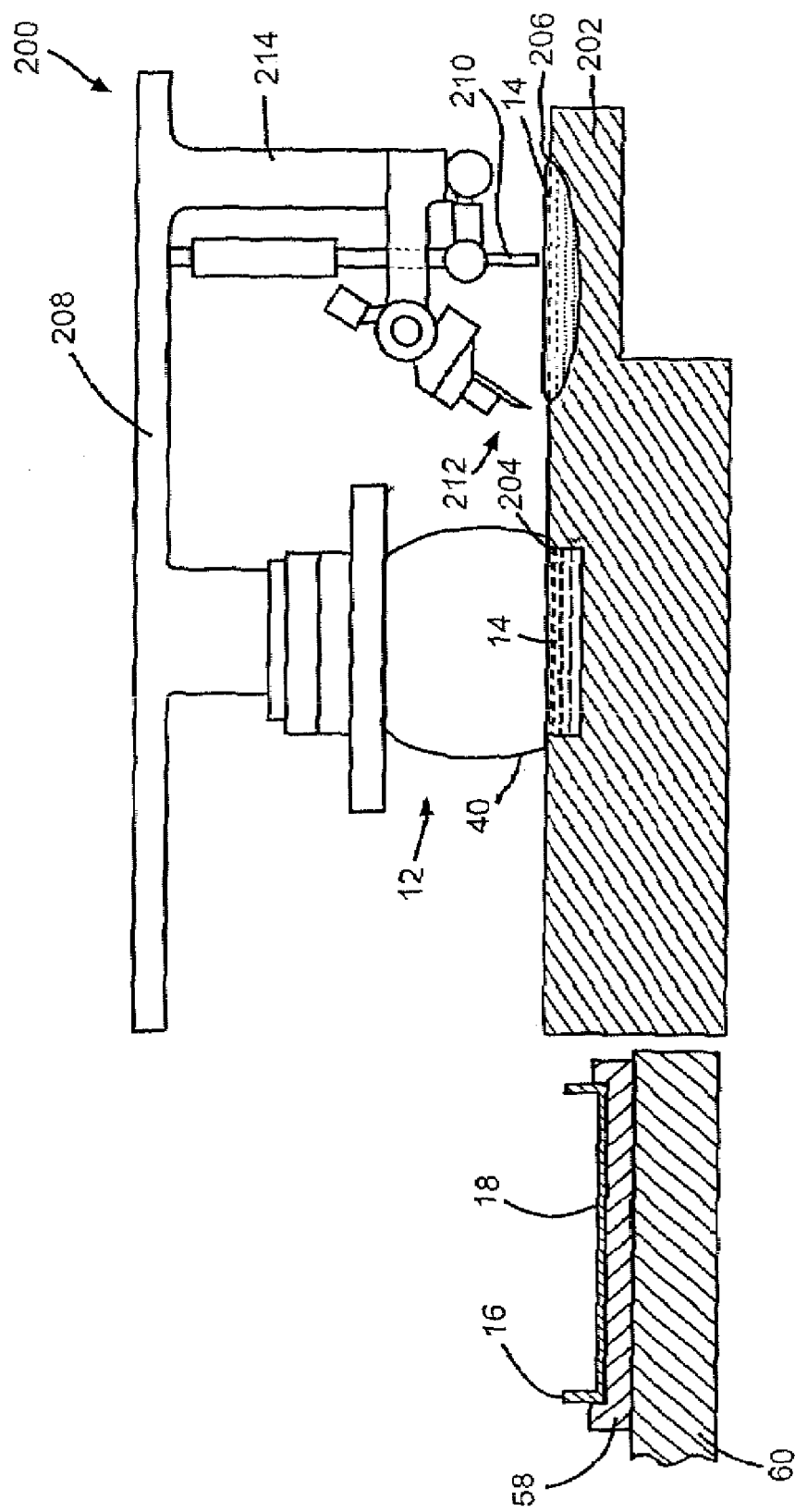
FIG. 21 is a schematic view of the pad printing apparatus 200 with the printing tampon 12 contacting the ink.
Figure 22:
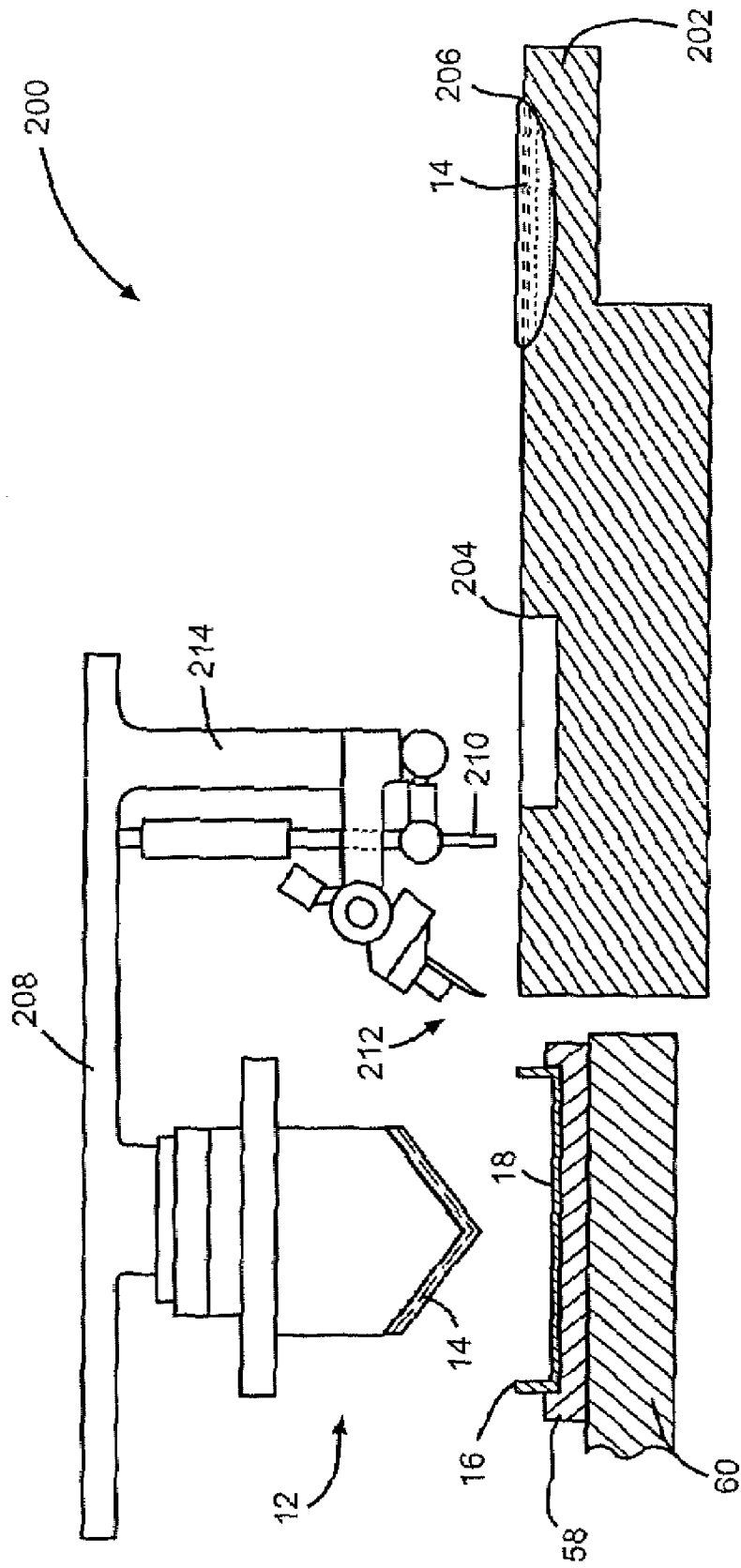
FIG. 22 is a schematic view of the pad printing apparatus 200 with the inked printing tampon 12 positioned vertically above the substrate 16.
Figure 23:
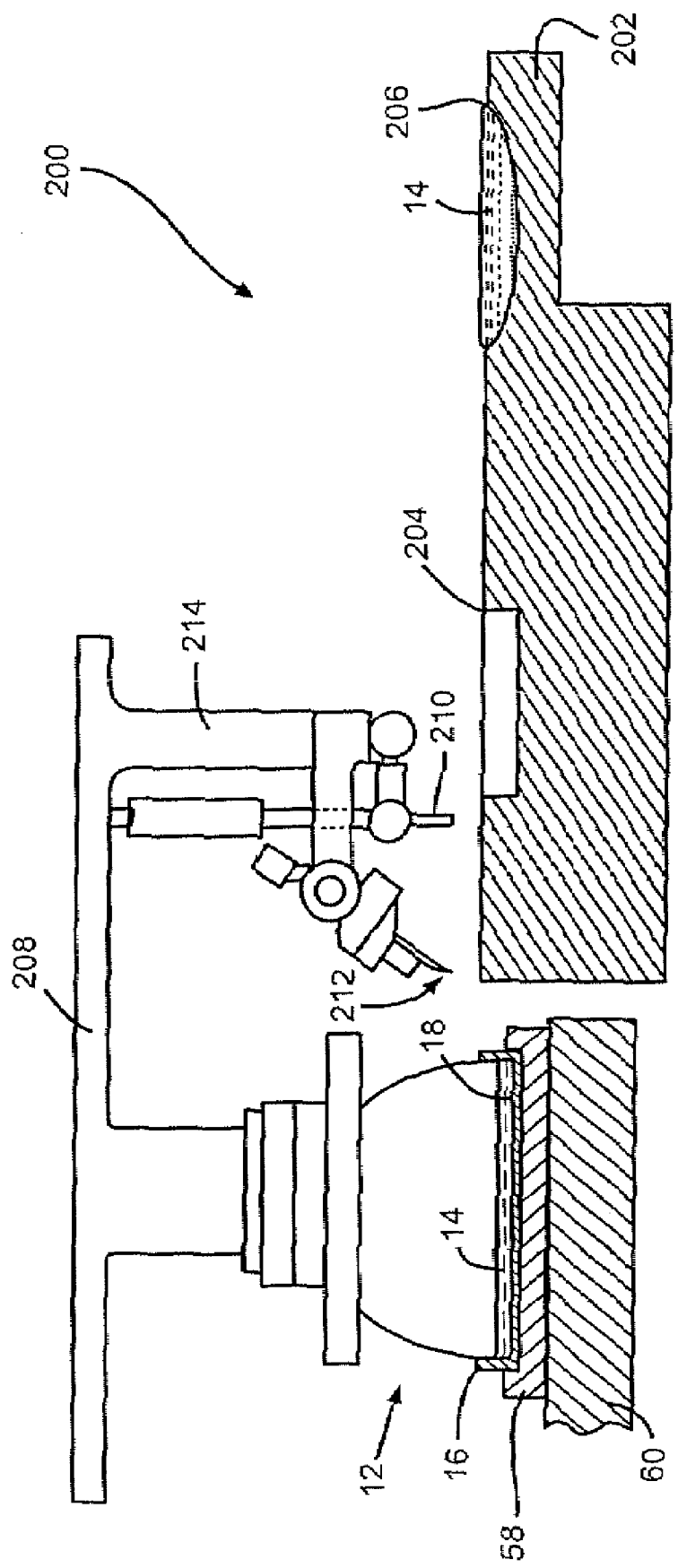
FIG. 23 is a schematic view of the pad printing apparatus 200 with the inked printing tampon 12 contacting the substrate 16.

In FIG. 21, the squeegee 210 and doctor blade 212 are pivoted out of contact with the cliché 202. This helps prevent wear. In this drawing, the tampon 12 has also moved in a downwardly direction so that the extended pad portion 40 contacts and picks up the reagent ink 14 onto its printing surface. The inked printing tampon 12 is then retraced and moved into a raised position directly above the substrate 16 (FIG. 22). FIG. 23 shows the printing tampon 12 having been actuated in a downwardly direction to contact the bottom wall 18 of the substrate with its inked pad portion 40. As the pad portion deforms, it completely contacts the area of the substrate 16 to coat the reagent ink thereon. As previously described, the conductive block 58 and workstation 60 maintain the substrate at the desired temperature. The inked substrate 16 is then removed from the conductive block 58 and heated work stage 60 for further processing into an electrical energy storage device. A second substrate is positioned on the conductive block and the cycle is repeated.

FIGS. 24 to 27 illustrate a further embodiment of a rotary gravure pad printing apparatus 300. This apparatus comprises an inkwell 302 containing reagent ink, a cliché in the form of a rotating drum 304, a main roller 306 and a substrate wheel 308. While not shown in the drawings, the wheel 308 supports a plurality of substrates that will subsequently be processed into electrical energy storage devices according to the present invention.

Figure 24:
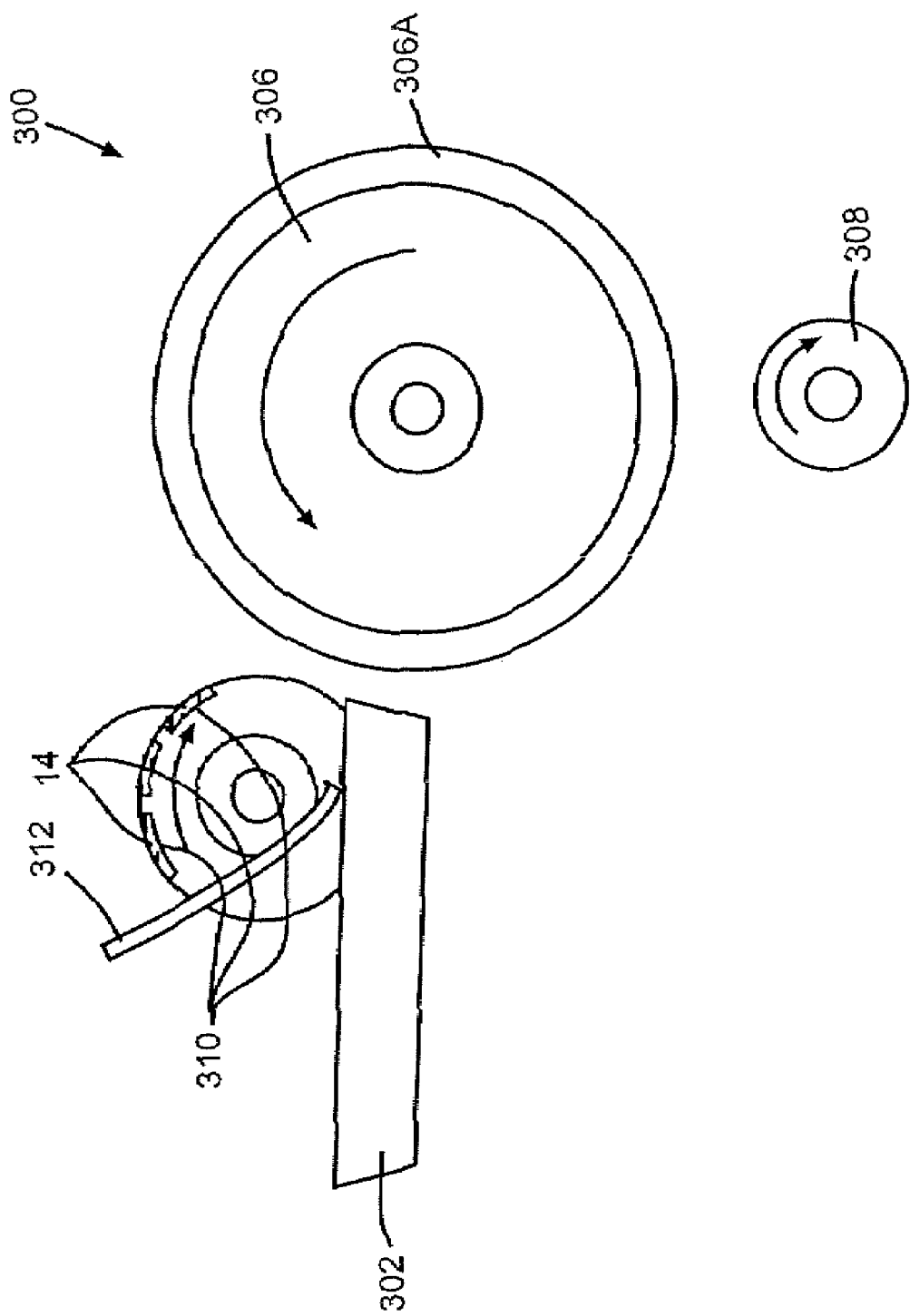
FIG. 24 is a schematic view of a rotary gravure pad printing apparatus 300 showing a cliché drum 304 picking up a reagent ink 14 from a well 302 for transfer to a main roller 306 and ultimately to substrates located on a substrate wheel 308.

FIG. 24 shows the cliché drum 304 rotating with its surface immersed in the inkwell 302 to fill the reagent ink 14 into recesses 310 spaced along its surface. A squeegee 312 is in the form of a fork having legs supported on the inkwell on opposite sides of the drum 304. An intermediate portion between the legs wipes excess reagent ink from the cliché drum 304 so that a precise quantity of reagent ink is filled in the recesses 310.

Figure 25:
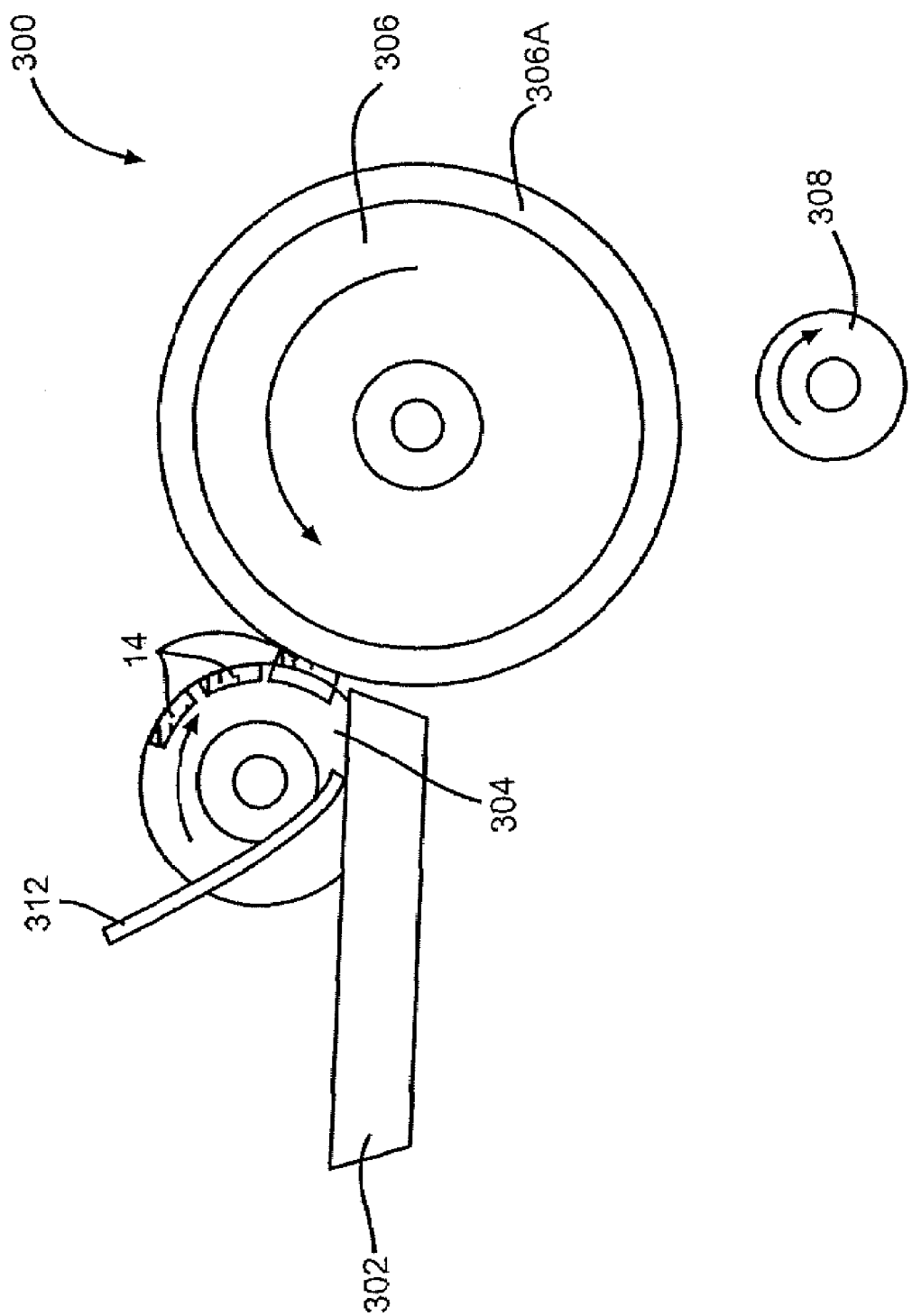
FIG. 25 is a schematic view of the rotary gravure pad printing apparatus 300 with the reagent ink 14 being transferred from the cliché drum 304 to the main roller 306.
Figure 26:
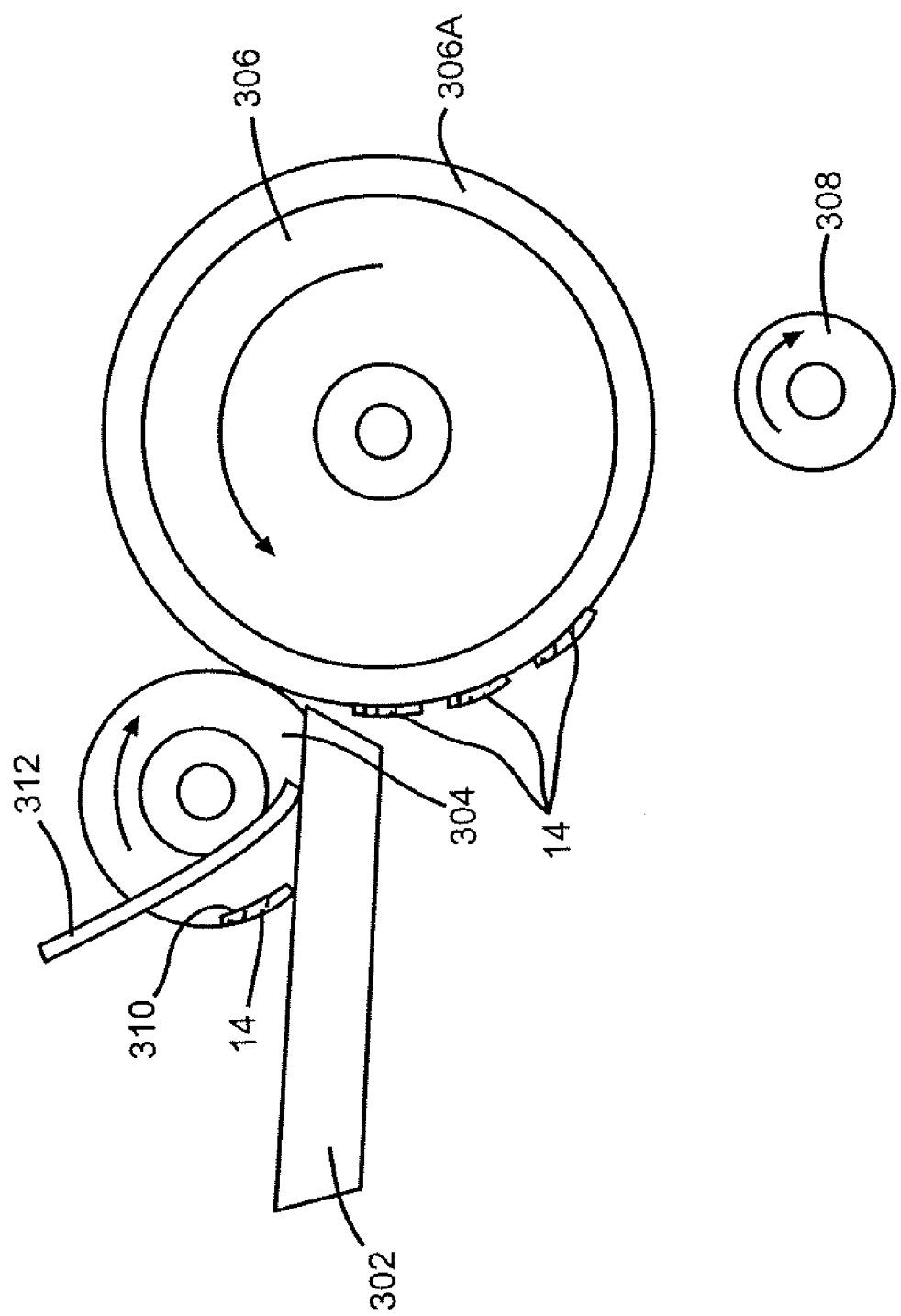
FIG. 26 is a schematic view of the rotary gravure pad printing apparatus 300 with the reagent ink 14 contacted to the main roller 306.
Figure 27:
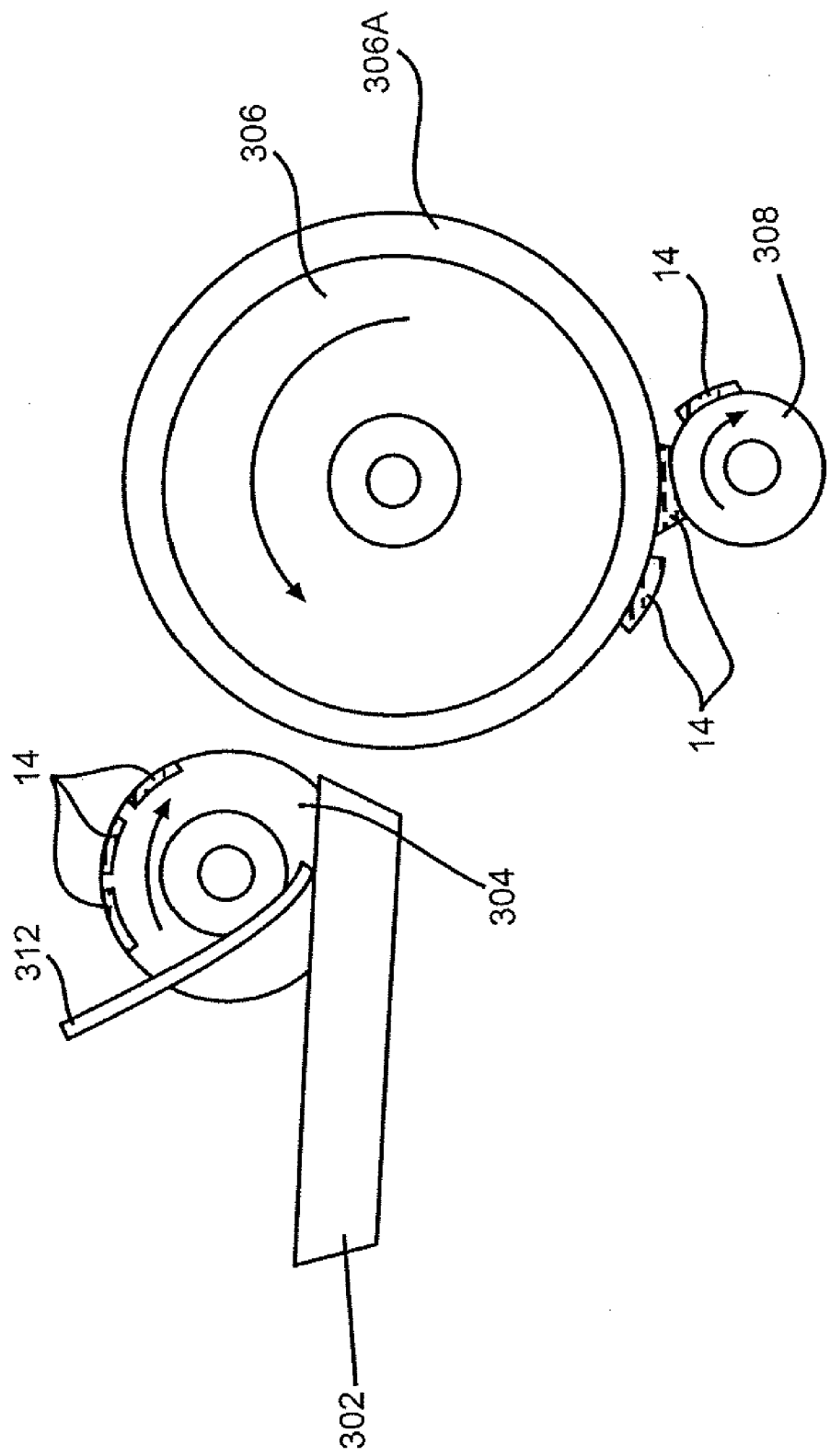
FIG. 27 is a schematic view of the rotary gravure pad printing apparatus 300 with the reagent ink 14 being transferred from the main roller 306 to substrates located on a substrate wheel 308.

In FIG. 25, the main drum 306 has moved into contact with the cliché drum 304. The main drum 306 is provided with a release contact surface 306A, preferably of silicone, that enables the reagent ink 14 to transfer from the cliché thereto, as shown in FIG. 26. The rotating substrate wheel 308 moves into contact with the main drum 306 so that the reagent ink 14 is deposited onto substrates (not shown) carried thereon. In this embodiment, the substrates are plate shaped members that are heat processed as previously described and then supported on the bottom wall 18 of the substrate 16 shown in the previous drawings.

The anode electrode of the electrolytic capacitor is typically of a valve metal selected from the group consisting of tantalum, aluminum, titanium, niobium, zirconium, hafnium, tungsten, molybdenum, vanadium, silicon and germanium, and mixtures thereof in the form of a pellet. This is done by compressing the valve metal in powdered form, for example tantalum powder, into a pellet having an anode lead extending therefrom, and sintering the pellet under a vacuum at high temperatures. Preferably, one of the previously described binders, preferably a poly(alkylene carbonate), is used to promote cohesion with the pressed powder body. The binder adds green strength to the pressed body and helps with powder flow before pressing. For tantalum, the powder material can be provided by either the beam melt process or the sodium reduction process, as is well known to those skilled in the art.

Regardless of the process by which the valve metal powder was processed, pressed valve metal powder structures, and particularly tantalum pellets, are typically anodized to a desired voltage in formation electrolytes consisting of ethylene glycol or polyethylene glycol, de-ionized water and $H_3PO_4$. These formation electrolytes have conductivities of about 250 µS/cm to about 2,600 µS/cm at 40° C. The other main type of formation electrolyte is an aqueous solution of $H_3PO_4$. This type of electrolyte has conductivities up to about 20,000 µS/cm at 40° C. Anodizing serves to fill the pores of the pressed valve metal body with the electrolyte and form a continuous dielectric oxide film on the sintered body. Anodizing produces an oxide layer over the terminal lead/anode lead weld.

The anode can also be of an etched aluminum or titanium foil or, a sintered aluminum or titanium body.

A separator structure of electrically insulative material is provided between the anode and the cathode to prevent an internal electrical short circuit between the electrodes. The separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the capacitor. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR (DMS Solutech), a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). Cellulose based separators also typically used in capacitors are contemplated by the scope of the present invention. Depending on the electrolyte used, the separator can be treated to improve its wettability.

The anode and cathode electrodes are operatively associated with each other by an electrolyte solution filled in the casing through an electrolyte fill opening. Any electrolyte that is known for use with the particular anode and cathode active materials selected to provide acceptable capacitive performance over a desired operating range is contemplated by the scope of the present invention. Suitable electrolytes include sulfuric acid in an aqueous solution. Specifically, a 38% sulfuric acid solution performs well at voltages of up to about 125 volts. A 10% to 20% phosphoric acid/water solution is known to provide an increased equivalent series resistance (ESR) and breakdown voltage. Other suitable electrolytes are described in U.S. Pat. No. 6,219,222 to Shah et al. and U.S. Pat. No. 6,687,117 to Liu et al. These patents are assigned to the assignee of the present invention and incorporated herein by reference.

The following examples describe capacitors made by a pad printing process according to the present invention, and set forth the best mode contemplated by the inventors of carrying out the invention.

EXAMPLE I

One hundred fifty titanium substrates as casing portions similar to substrate 16 in the drawing figures were coated with an active ruthenium dioxide material by a closed inkwell pad printing process according to the present invention. The ink was a suspension of ruthenium dioxide and polyvinyl butyral binder in a solvent mixture of terpineol and butyl carbitol. The coated substrates were then divided into three groups of fifty substrates apiece. The first group was heated to a maximum temperature of 200° C., the second group was heated to 300° C. and the third group was heated to 400° C.

Test capacitors were then constructed from the processed cathode substrates. Each capacitor comprised a pressed and anodized tantalum powder anode positioned between two mating casing portions containing ruthenium oxide cathode coatings heated to the same final temperature. An electrolyte was filed into the sealed casing to contact the anode and the cathode, which were segregated from each other by a separator. This resulted in three groups of twenty-five capacitors. Each capacitor was charged to about 215 volts and discharged into a 16.5-ohm resistor once every 14 days. In the interim they were stored at 85° C.

Figure 28:
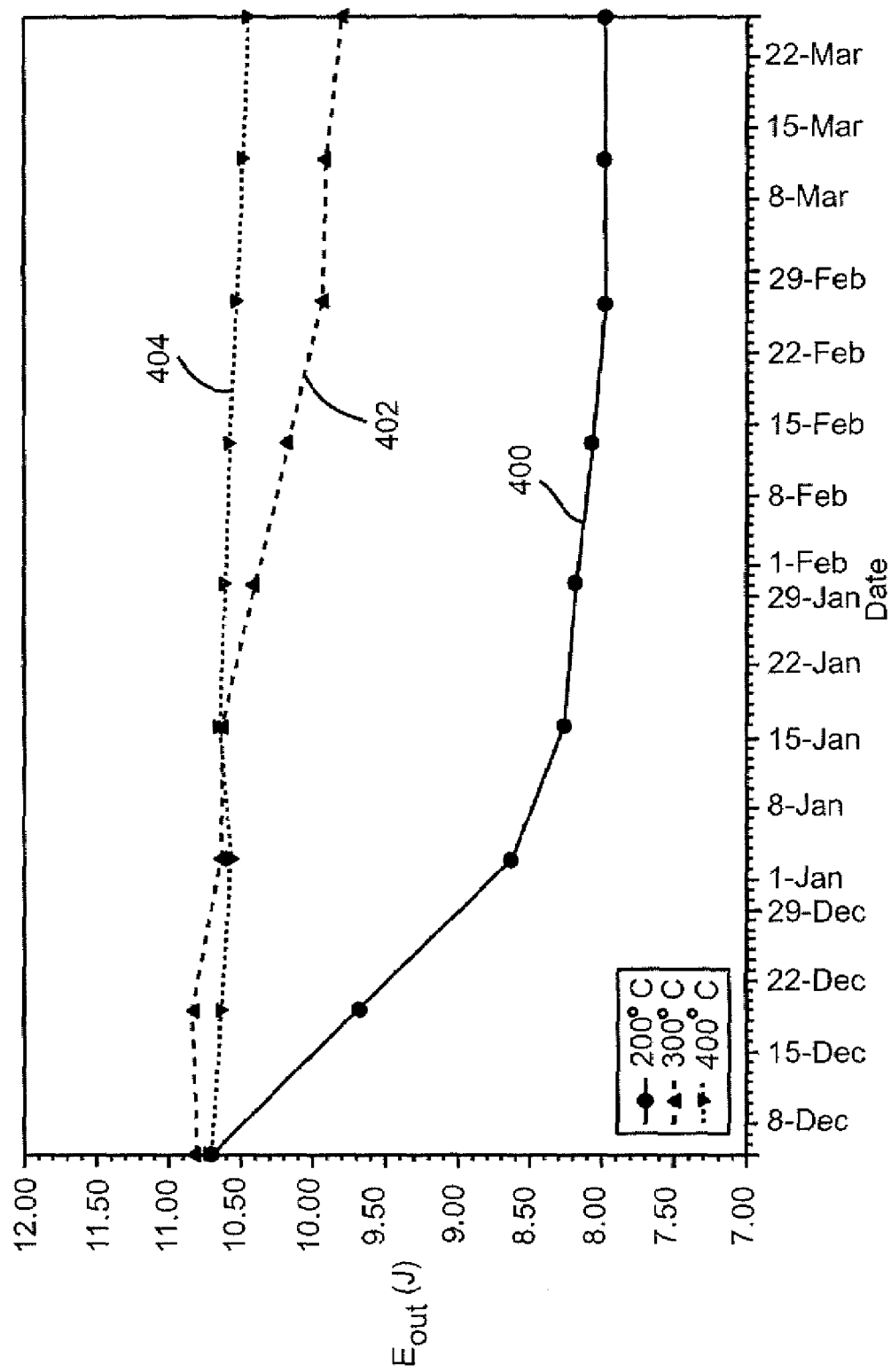
FIG. 28 is a graph constructed from the average energy delivered by tantalum capacitors having cathodes of pad printed ruthenium oxide heated to various final temperatures.

FIG. 28 is a graph constructed from the average energy delivered by each capacitor in a group. In particular, curve 400 is the average of the capacitors containing the cathodes heated to 200° C., curve 402 is the average of the capacitors containing the cathodes heated to 300° C. and curve 404 is the average of the capacitors containing the cathodes heated to 400° C. It is clear that the final heating temperature of the pad printed ruthenium oxide cathode material is critical in the energy efficiency of the capacitors. It is believed that 300° C. is the temperature at which the poly(propylene carbonate) binder completely decomposes into harmless carbon dioxide and water.

EXAMPLE II

Figure 29:
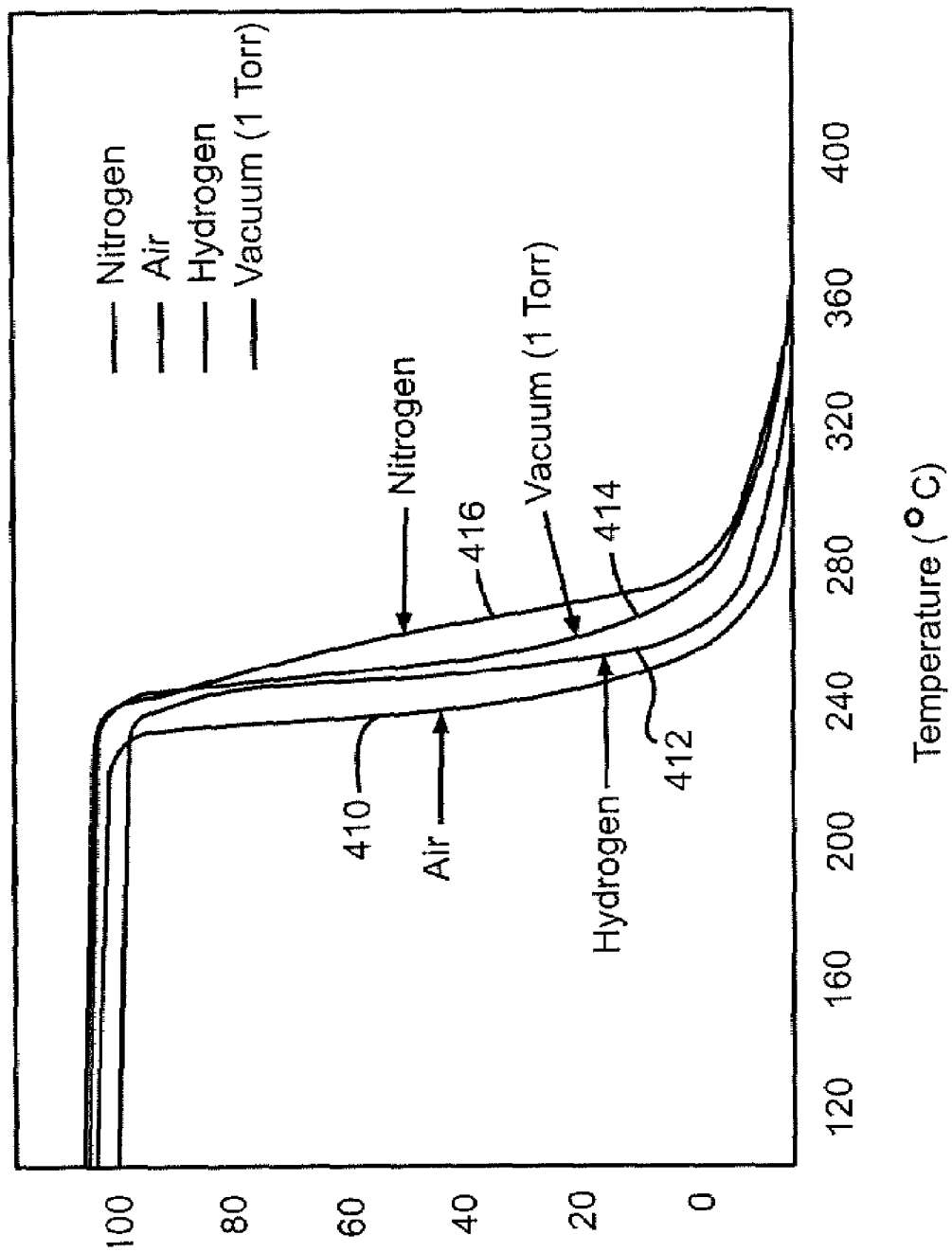
FIG. 29 is a graph of weight loss versus heating temperature for a poly(propylene carbonate) binder.

FIG. 29 is a graph showing the weight loss versus heating temperature for a poly(propylene carbonate) binder. Curve 410 is constructed from the binder heated in air, curve 412 is from the binder heated in hydrogen, curve 414 is from the binder heated in a vacuum (1 Torr) and curve 416 is from the binder heated in nitrogen. It can be seen that substantially all of the weight loss occurs prior to heating at about 300° C.

EXAMPLE III

Figure 30:
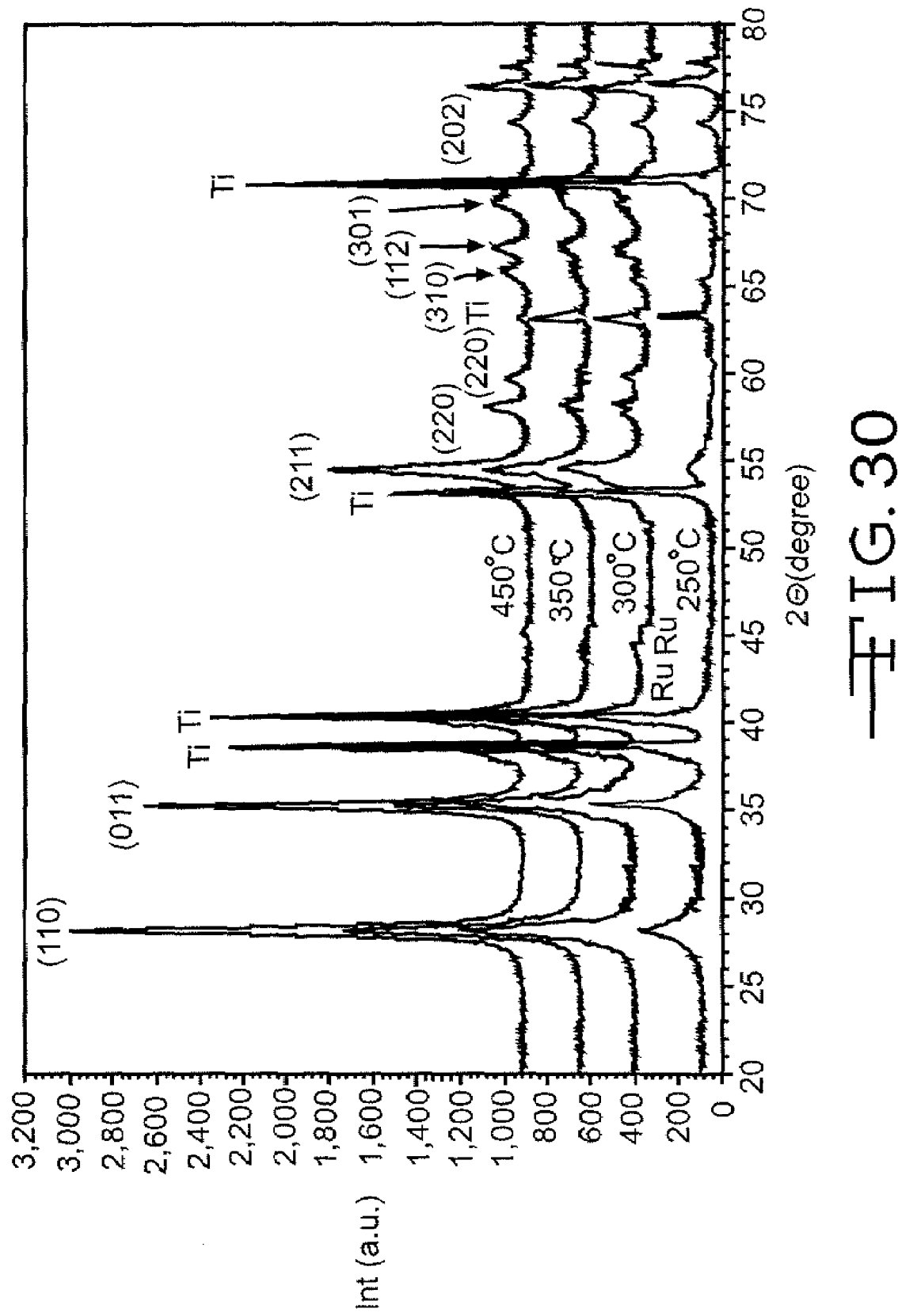
FIG. 30 is an x-ray diffraction scan of ruthenium oxide pad printed according to the present invention and heated to various final temperatures.

Substrates pad printed in a similar as those used to construct the capacitors of the three groups used in Example I were heated to 250° C., 300° C., 350° C. and 450° C., respectively. The substrates were then subjected to an x-ray diffraction (XRD) analysis. The results are shown in FIG. 30. This XRD graph is indicative of the crystallinity of the ruthenium oxide active material. The higher peaks indicate a more crystalline material. It is clear that the ruthenium oxide material heated to a final temperature of 250° C. is not as crystalline as the other materials heated to higher temperatures.

EXAMPLE IV

For applications where a coated substrate is intended for use in a supercapacitor (a capacitor where a metal oxide, for example ruthenium dioxide, serves as both cathode and anode), it is important that the specific capacitance is maximized. However, for applications where a ruthenium oxide coated substrate serves as the cathode in an electrolytic hybrid capacitor, such as one having a pressed powder tantalum anode, this is not critical since the anode dominates system performance.

Figure 31:
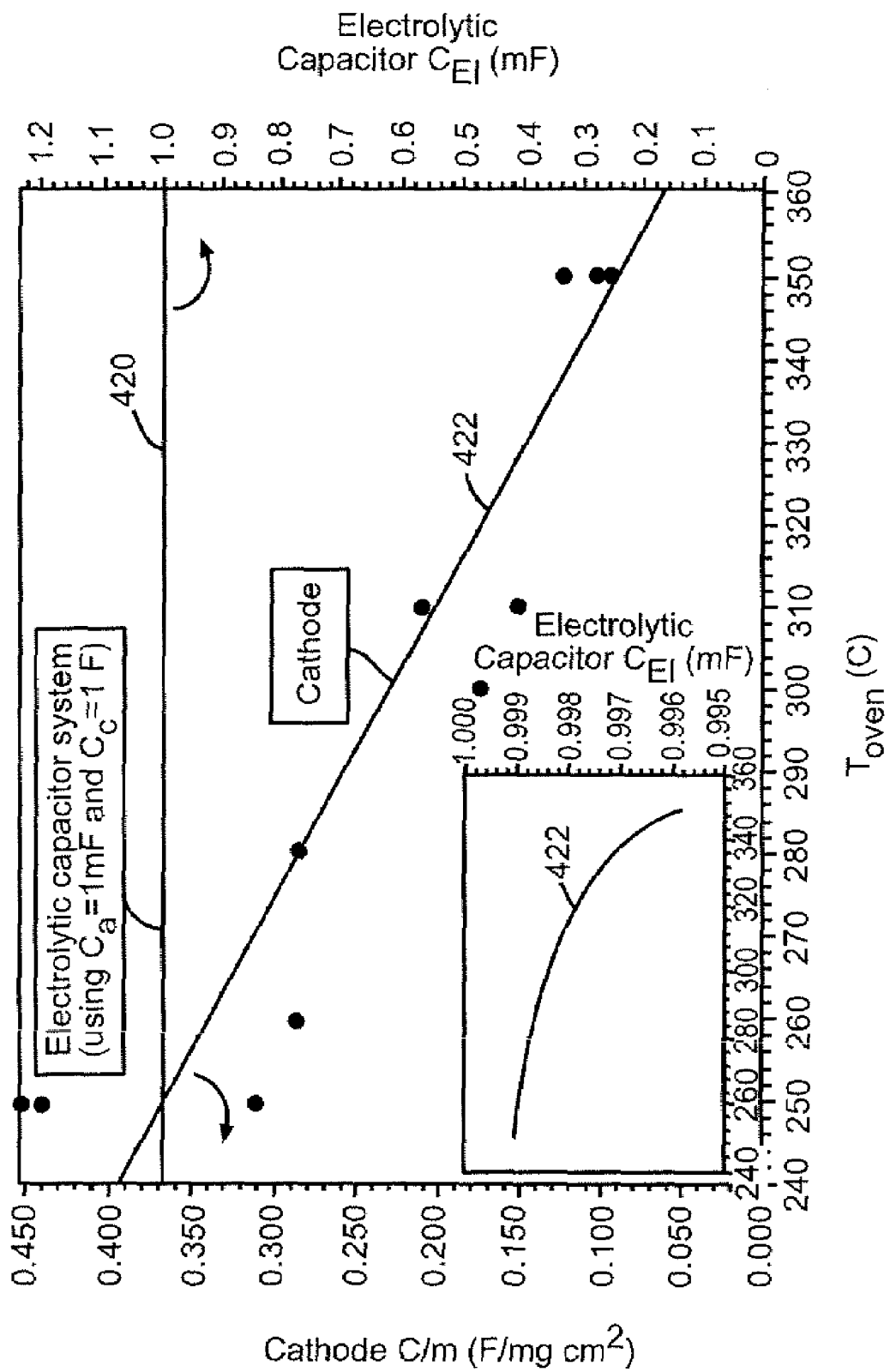
FIG. 31 is a graph of the average specific capacitance of ruthenium oxide coated titanium substrates heated to various temperatures and calculation of the hypothetical capacitance of an electrolytic capacitor.

Assuming an electrolytic capacitor is constructed having a tantalum anode with a capacitance $C_a$ of 1 mF and a cathode containing 2.7178 mg of the ruthenium dioxide. This mass results in a cathode capacitance of $C_c$=1 mF at 250° C. This electrolytic capacitor can be modeled as a system of an anode and a cathode capacitor in series. The resulting capacitance of such an electrolytic capacitor can be calculated using the formula $C=C_a*C_c/(C_a+C_c)$. Curve 420 in FIG. 31 is the capacitance calculation of this hypothetical electrolytic capacitor.

Capacitors were constructed containing substrates pad printed in a similar manner as those used to construct the capacitors in Example I. The cathodes were heated to the temperatures indicated in the abscissa in FIG. 31. Decreased capacitance at higher anneal temperatures is a well-established fact. The temperature dependence of the capacitance of these electrolytic capacitors based on the anneal temperature of the cathode is designated by curve 422 in FIG. 31. It is essentially a horizontal line. The insert figure is a magnified view showing that for this example using a temperature of 350° C. instead of 250° C. decreases the overall capacitance from 0.999 F to 0.996 F. This is a decrease of 0.3%. Most electrolytic capacitors only use a small amount of cathode material, however, using more cathode active material can compensate for a non-optimal specific capacitance.

EXAMPLE V

Substrates pad printed in a similar manner as those used to construct the capacitors in Example I were heated to 350° C. The capacitors were then subjected to shock and vibration testing. Vibration test consisted of subjecting a capacitor to random vibration in each of three orthogonal axes with the following levels: 10 Hz: 0.03 $G^2$/Hz, 40 Hz: 0.03 $G^2$/Hz, 500 Hz: 0.0003 $G^2$/Hz, for 1 hour per axis. Shock testing consisted of subjecting a capacitor to a shock pulse using a dummy weight equivalent to that of the test unit. The shock pulse was 750 g's with one-millisecond duration. The capacitors were subjected to three shocks in both directions of three orthogonal axes (for a total of 18 shocks).

Figure 32:
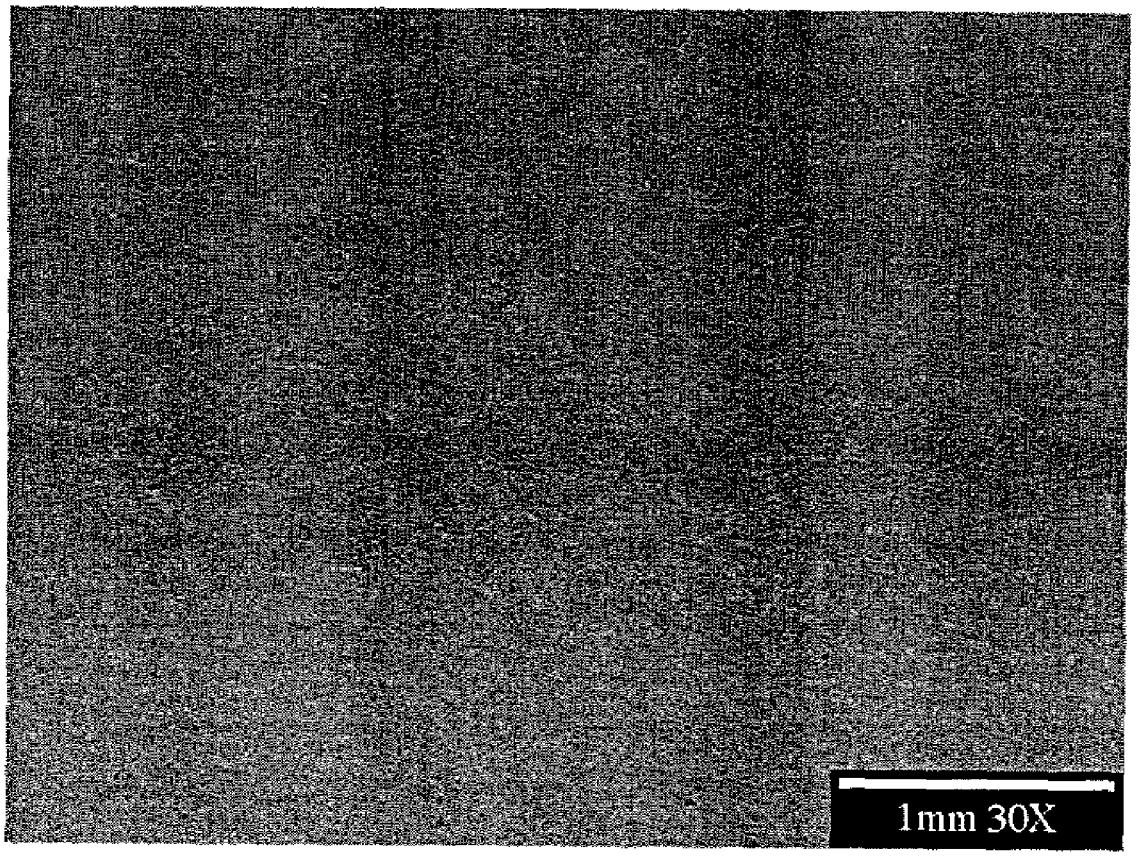
FIGS. 32 and 33 are backscatter images of ruthenium oxide coated on a titanium substrate by a pad printing process and ultrasonically spray coated on a titanium substrate according to the prior art, respectively.
Figure 33:
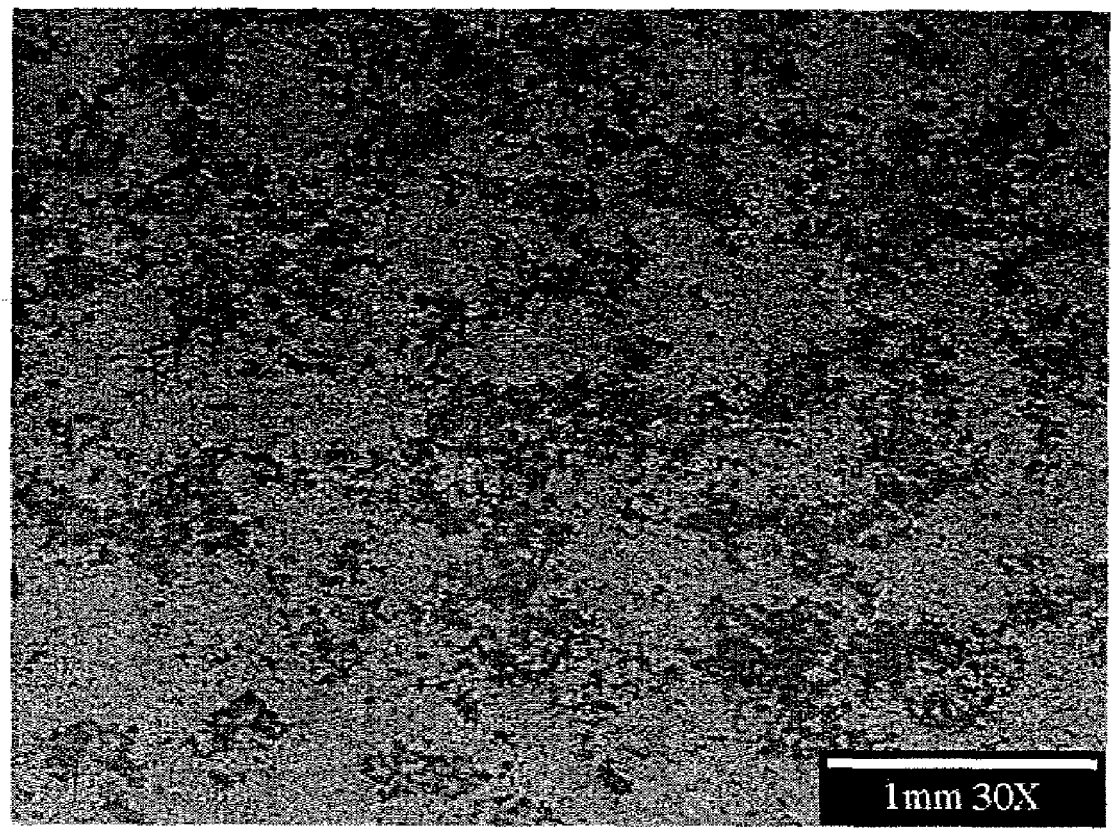

A backscattered image of the substrates removed from the capacitors is shown in FIG. 32. This is in contrast to the backscatter image shown in FIG. 33 of similarly built capacitor having a cathode of a ruthenium nitrosyl nitrate precursor heated spray coated onto a titanium substrate according to the previously discussed U.S. Pat. Nos. 5,894,403, 5,920,455, 5,926,362, 6,224,985, 6,334,879 and 6,468,605. The final heating temperature for this comparative substrate was 350° C. In FIG. 33, the dark regions are the titanium substrate with the light areas being the ruthenium oxide material. It is apparent that a large portion of the ruthenium oxide material has failed to stay adhered to the substrate and instead has sloughed off. In contrast, the present invention substrate of FIG. 32 shows the ruthenium oxide remaining completely adhered to the titanium substrate after shock and vibration testing.

EXAMPLE VI

Figure 34A:
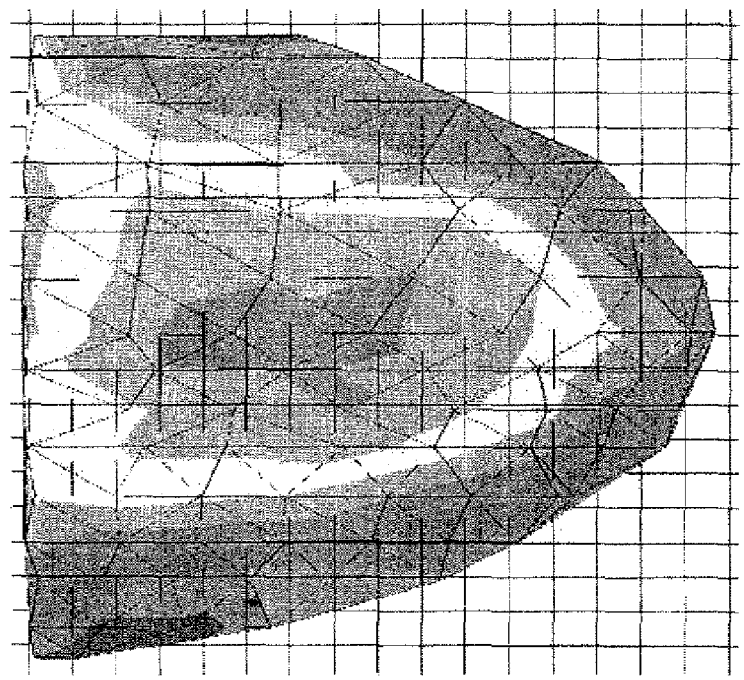
FIGS. 34A and 34B are x-ray fluorescence scans of ruthenium dioxide coating, the former deposited by the prior art ultrasonic spray coating method, the former by a closed inkwell pad printing process.
Figure 34B:
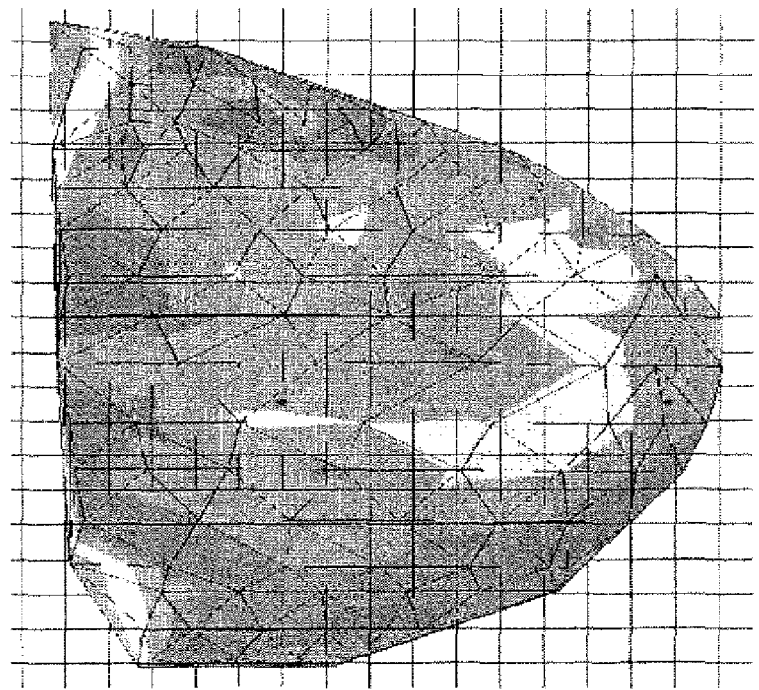

The x-ray fluorescence (XRF) for two ruthenium oxide layers is shown in FIGS. 34A and 34B. The former was created from ruthenium nytrosyl nitrate ultrasonically spray deposited according to the previously discussed U.S. Pat. Nos. 5,894,403, 5,920,455, 5,926,362, 6,224,985, 6,334,879 and 6,468,605 and heat converted into the product ruthenium oxide. The latter scan is from a pad printed ruthenium oxide layer using the closed inkwell method. In each case, the strength of the XRF signal was proportional to the thickness of the ruthenium dioxide layer. The topographical map of the thickness of the ruthenium dioxide layer created by the ultrasonic spray coating (FIG. 34A) varies from 1.2 in the very dark regions around the perimeter to 3.85 for the very light gray section and up to 4.88 for the dark grey section in the center of the scan. The thickness distribution has the shape of a hill with the readings ranging from 1.20 to 4.88.

In contrast, the signal strength of the pad printed ruthenium dioxide coating is much more uniform. The very light grey shaded region corresponds to peaks of signal strength of 3.90. They are on top of a large medium grey plateau having signal strength of 3.60. There are occasional valleys (darker gray) of 3.30. About 90% of the pad printed surface has signal strength of between 3.30 and 3.90, a variation of about +/−10% from the average plateau height. Only at the extreme perimeters do the signals drop to 2.40 and peaks up to 4.50 can be observed.

Thus, it is evident that the present pad printing processes fulfill their objectives by providing a pseudocapacitive oxide coating, nitride coating, carbon nitride coating, or carbide coating having coating thickness uniformity, better adhesion, sustained long-term performance when stored at high temperature during accelerated life test and an acceptable surface area commensurate with that obtained by ultrasonically spraying, but with increased yields.

It is appreciated that various modifications to the inventive concepts described herein may be apparent to those of ordinary skill in the art without departing from the scope of the present invention as defined by the appended claims.

What is claimed is:

1. A method for providing an electrode for an electrical energy storage device, comprising the steps of:
    a) providing a metal as a flowable powder;
    b) mixing the powdered metal with a binder comprising a poly (alkylene carbonate) having the general formula R—O—C(=O)—O with R=C1 to C5;
    c) pressing the powdered metal and binder into a shaped body; and
    d) heating the shaped body to substantially decompose the binder and sinter the metal to thereby provide the electrode.

2. The method of claim 1 including providing the metal as a valve metal selected from the group consisting of tantalum, aluminum, titanium, niobium, zirconium, hafnium, tungsten, molybdenum, vanadium, silicon, germanium, and mixtures thereof.

3. The method of claim 1 including providing the metal as tantalum made by either a beam melt process or a sodium reduction process.

4. The method of claim 1 including selecting the binder from either poly(ethylene carbonate) or poly(propylene carbonate).

5. The method of claim 1 including heating the shaped body under a vacuum.

6. The method of claim 1 including providing the electrode having a lead extending therefrom.

7. The method of claim 1 further including anodizing the electrode resulting from step d) to a desired formation voltage.

8. The method of claim 1 including providing the electrode as a tantalum body for a capacitor.

9. A method for providing an electrolytic capacitor, comprising the steps of:
    a) providing an anode comprising the steps of:
        i) providing a valve metal as a flowable powder;
        ii) mixing the powdered valve metal with a binder;
        iii) pressing the powdered valve metal and binder into a shaped body; and
        iv) heating the shaped body to substantially decompose the binder and sinter the valve metal to thereby provide the anode; and
    b) providing a cathode of a cathode active material;
    c) segregating the anode and the cathode from direct contact with each other by an intermediate separator;
    d) housing the anode and cathode is a casing; and
    e) providing a working electrolyte inside the casing contacting the anode and the cathode.

10. The method of claim 9 including selecting the cathode active material from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, and mixtures thereof.

11. The method of claim 9 including selecting the binder from the group consisting of ethyl cellulose, acrylic resin, polyvinyl alcohol, polyvinyl butyral and a poly (alkylene carbonate) having the general formula R—O—C(=O)—O with R=C1 to C5.

12. The method of claim 9 including selecting the binder from either poly(ethylene carbonate) or poly(propylene carbonate).

13. The method of claim 9 including providing the metal as tantalum made by either a beam melt process or a sodium reduction process.

14. The method of claim 9 including heating the shaped body under a vacuum.

15. The method of claim 9 including providing the electrode having a lead extending therefrom.

16. The method of claim 9 further including anodizing the electrode resulting from step d) to a desired formation voltage.

17. The method of claim 9 including providing the metal as a valve metal selected from the group consisting of tantalum, aluminum, titanium, niobium, zirconium, hafnium, tungsten, molybdenum, vanadium, silicon, germanium, and mixtures thereof.

18. A method for providing an electrolytic capacitor, comprising the steps of:
    a) providing an anode comprising the steps of:
        i) providing tantalum as a flowable powder;
        ii) mixing the powdered tantalum with a binder selected from either poly(ethylene carbonate) or poly(propylene carbonate);
        iii) pressing the powdered tantalum and binder into a shaped body; and
        iv) heating the shaped body to substantially decompose the binder and sinter the tantalum to thereby provide the anode; and
    b) providing a cathode of a cathode active material;
    c) segregating the anode and the cathode from direct contact with each other by an intermediate separator;
    d) housing the anode and cathode is a casing; and
    e) providing a working electrolyte inside the casing contacting the anode and the cathode.

19. The method of claim 18 including selecting the cathode active material from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, and mixtures thereof.

20. The method of claim 18 including heating the shaped body under a vacuum.

* * * * *

(12) INTER PARTES REVIEW CERTIFICATE (91st)
United States Patent
Seitz et al.

(10) Number: US 7,244,279 K1
(45) Certificate Issued: Jul. 7, 2015

(54) USE OF POLY(ALKYLENE) CARBONATES IN THE MANUFACTURE OF VALVE METAL ANODES FOR ELECTROLYTIC CAPACITORS

(75) Inventors: Keith Seitz; Ashish Shah; Barry Muffoletto; Wolfram Neff; Douglas Eberhard

(73) Assignee: MANUFACTURERS AND TRADERS TRUST COMPANY

Trial Number:

IPR2014-01461 filed Sep. 8, 2014

Petitioner: AVX Corporation

Patent Owner: Greatbatch Ltd.

Inter Partes Review Certificate for:

Patent No.: 7,244,279
Issued: Jul. 17, 2007
Appl. No.: 11/306,272
Filed: Dec. 21, 2005

The results of IPR2014-01461 are reflected in this inter partes review certificate under 35 U.S.C. 318(b).

INTER PARTES REVIEW CERTIFICATE
U.S. Patent 7,244,279 K1
Trial No. IPR2014-01461
Certificate Issued Jul. 7, 2015

AS A RESULT OF THE INTER PARTES REVIEW PROCEEDING, IT HAS BEEN DETERMINED THAT:

Claims 1-20 are cancelled.

\* \* \* \* \*